United States Patent
Mitsutani

[19]

[11] Patent Number: 5,848,527
[45] Date of Patent: Dec. 15, 1998

[54] APPARATUS FOR DETECTING DETERIORATION OF A THREE-WAY CATALYTIC CONVERTER FOR AN ENGINE

[75] Inventor: Noritake Mitsutani, Toyota, Japan

[73] Assignee: Toyota Jidosha Kabushiki Kaisha, Toyota, Japan

[21] Appl. No.: 824,299

[22] Filed: Mar. 26, 1997

[30] Foreign Application Priority Data

Apr. 11, 1996 [JP] Japan ................................. 8-089674

[51] Int. Cl.⁶ .............................. F01N 3/20; F02D 41/14; F02D 41/22
[52] U.S. Cl. ................................ 60/274; 60/276; 60/277
[58] Field of Search .......................... 60/274, 276, 277; 73/118.1; 701/103, 109

[56] References Cited

U.S. PATENT DOCUMENTS

| | | | |
|---|---|---|---|
| 5,279,116 | 1/1994 | Shimizu et al. | 60/277 |
| 5,282,383 | 2/1994 | Kayanuma | 73/118.1 |
| 5,301,501 | 4/1994 | Shimizu et al. | 60/274 |
| 5,303,548 | 4/1994 | Shimizu et al. | 60/277 |
| 5,359,853 | 11/1994 | Shimizu | 60/276 |
| 5,377,484 | 1/1995 | Shimizu | 60/276 |
| 5,412,941 | 5/1995 | Suzuki et al. | 60/276 |
| 5,414,996 | 5/1995 | Sawada | 60/277 |
| 5,417,058 | 5/1995 | Shimizu | 60/276 |
| 5,426,937 | 6/1995 | Ohuchi et al. | 60/276 |
| 5,684,248 | 11/1997 | Iwata | 73/118.1 |
| 5,724,809 | 3/1998 | Mitsutani et al. | 60/276 |
| 5,732,553 | 3/1998 | Mitsutani | 60/276 |
| 5,737,916 | 4/1998 | Mitsutani | 60/276 |
| 5,743,086 | 4/1998 | Nagai | 60/276 |
| 5,752,382 | 5/1998 | Hanafusa et al. | 60/277 |

*Primary Examiner*—Tony M. Argenbright
*Attorney, Agent, or Firm*—Oliff & Berridge, PLC

[57] ABSTRACT

The object of the present invention is to provide an apparatus for detecting the deterioration of a converter enabled to avoid a misjudgement even though the balance between the oxygen absorbing power and the oxygen releasing power disappears. The present apparatus is furnished with an upstream air-fuel ratio sensor installed at the upstream side of the converter and a downstream air-fuel ratio sensor installed at the downstream side of the converter. The deterioration of the converter is detected in accordance with the trajectory lengths of these sensors, and a parameter which denotes the oxygen balance of the converter is calculated in accordance with the outputs of these sensors. When the value of the parameter is outside a fixed lower limit or a fixed upper limit, the detection for deterioration is inhibited in order to prevent a misjudgement occuring.

14 Claims, 23 Drawing Sheets

APPARATUS FOR DETECTING DETERIORATION OF A THREE-WAY CATALYTIC CONVERTER FOR AN ENGINE

BACKGROUND OF THE INVENTION

1. Field of the Invention

This invention relates to an apparatus for detecting deterioration of a three-way catalytic converter for an engine, and especially relates to an apparatus for detecting deterioration of the converter enabled to avoid a misjudgement when the balance between power for absorbing oxygen and that of releasing oxygen of the converter (hereafter the oxygen balance) disappears.

2. Prior Art

It is general to provide a three-way catalytic converter which not only oxidizes HC and CO, but also deoxidizes $NO_x$ in the exhaust system of an internal combustion engine in order to purify unburned combustibles (HC, CO and $NO_x$).

Because it is necessary to control an air-fuel ratio of mixture supplied to the engine at the stoichiometric air-fuel ratio to maintain purifying power of the converter, the air-fuel ratio of mixture is controlled by feeding back the output of an air-fuel ratio sensor which is installed at the upstream side of the converter, and detects residual oxygen density of the exhaust gas.

Control accuracy, however, may be lowered by the fluctuation of the output of the sensor due to incomplete mixing of the exhaust gas exhausted from cylinders and by the deterioration of the sensor caused by the radiated heat from the exhaust gas and the engine. To solve the above problem, the double sensor system which controls the air-fuel ratio of the mixture using not only the main air-fuel ratio feedback control in accordance with the output of the upstream sensor, but also the auxiliary air-fuel ratio feedback control in accordance with the output of a downstream sensor has been already proposed.

In the double sensor system, however, it is not avoidable that control accuracy may be lowered when the purifying power of the converter is deteriorated, that is, when the oxygen storage effect is lowered. Therefore, an apparatus for detecting deterioration of the converter in accordance with the length of the response curve of the output of the downstream sensor has been already known (See Japanese Unexamined Patent Publication 5-98948).

In this apparatus, when the converter is not actually deteriorated, the converter is principally determined as normal because the length of the response curve of the output of the downstream sensor is much shorter than that of the upstream sensor as the oxygen storage effect is effective and the reversing frequency of the output of the downstream sensor is not so much as that of the upstream sensor.

Conversely, the reversing frequency of the output of the downstream sensor increases when the converter is actually deteriorated. Therefore, the converter is principally determined as abnormal because the length of the response curve of the output of the downstream sensor becomes equal to that of the upstream sensor.

The above description is correct as long as the oxygen balance exists within fixed limits.

The apparatus, however, may cause misjudgement that the converter is already deteriorated though it is not actually deteriorated, because the reversing frequency of the output of the downstream sensor increases and the length of the response curve of the output of the downstream sensor becomes long when the balance between the power for absorbing oxygen and that of releasing oxygen falls below a limit.

FIG. 2 is a timing chart to explain the above problem, and FIG. 2(a) denotes the output of the downstream sensor and FIG. 2(b) denotes the balance between the oxygen absorbing power and the oxygen releasing power.

The downstream sensor detects the rich state before time $t_2$, and its output changes from the rich state to the lean state between time $t_2$ and $t_3$. It detects the lean state between time $t_3$ and $t_5$, and its output changes from the lean state to the rich state between time $t_5$ and $t_6$. It detects the rich state between time $t_6$ and $t_8$, and its output changes from the rich state to the lean state between time $t_8$ and $t_9$.

Therefore, the converter absorbs oxygen before time $t_3$, releases it between time $t_3$ and $t_6$, absorbs it between time $t_6$ and $t_9$, and releases it after time $t_9$. The amount of oxygen stored in the converter increases gradually before time $t_3$, the amount of oxygen stored in the converter decreases gradually between time $t_3$ and $t_6$, and the oxygen absorbing power increases gradually after time $t_9$.

Because amount of oxygen stored in the converter, however, is limited (limit levels are shown by one point chain lines in FIG. 2(b)), misjudgement may be caused when the balance between the oxygen absorbing power and the oxygen releasing power falls beyond the limits, that is, between time $t_1$, and $t_3$, between time $t_4$ and $t_6$, and between time $t_7$ and $t_9$.

SUMMARY OF THE INVENTION

Accordingly, the object of the invention is to provide an apparatus for detecting the deterioration of the converter enabled to avoid a misjudgement even though the balance between the oxygen absorbing power and the oxygen releasing power disappears.

FIG. 1 is a diagram of the basic structure of an apparatus for detecting deterioration of a converter according to the present invention.

According to the aspect of the present invention, there is provided an apparatus for detecting deterioration of a three-way catalytic converter disposed in an exhaust passage of an internal combustion engine comprising: an upstream air-fuel ratio sensor disposed in the exhaust passage at the upstream side of said catalytic converter for outputting a signal corresponding to the air-fuel ratio of the exhaust gas at the upstream side of said catalytic converter; a downstream air-fuel ratio sensor disposed in the exhaust passage at the downstream side of the converter for outputting a signal corresponding to the air-fuel ratio of the exhaust gas at the downstream side of the converter; an air-fuel ratio feedback control means for controlling the air-fuel ratio of the engine at least in accordance with the output of said upstream air-fuel ratio sensor; a deterioration detecting means for detecting a deterioration of the converter at least in accordance with the output of said downstream air-fuel ratio sensor; an oxygen balance estimating means for estimating a balance between the oxygen absorbing power and the oxygen releasing power; and a detection inhibiting means for inhibiting the detection of the deterioration in accordance with said deterioration detecting means when the oxygen balance estimated by said oxygen balance estimating means deviates from at least one fixed threshold.

The apparatus according to the present invention is inhibited from detecting deterioration of the converter when the balance falls below a limit in order to prevent misjudgement.

DETAILED DESCRIPTION OF THE PREFERRED EMBODIMENTS

Figure 1:
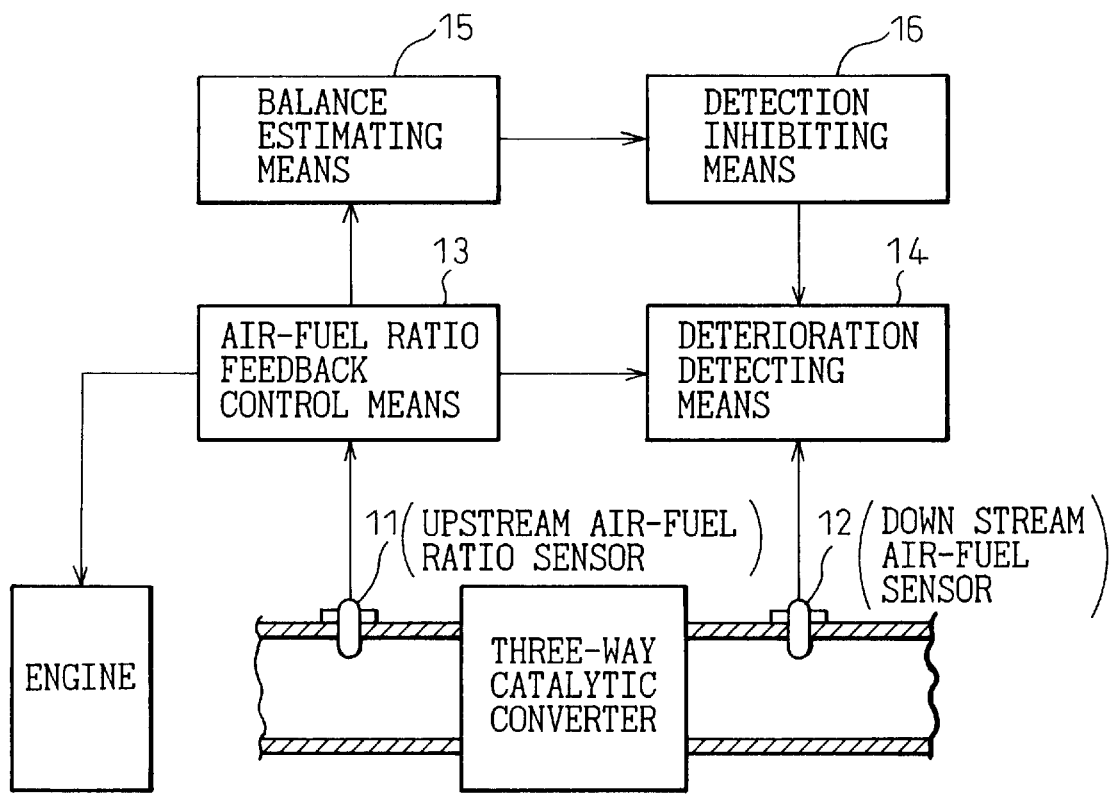
FIG. 1 is a diagram of the basic structure of an apparatus for detecting deterioration of a converter according to the present invention.
Figure 2:
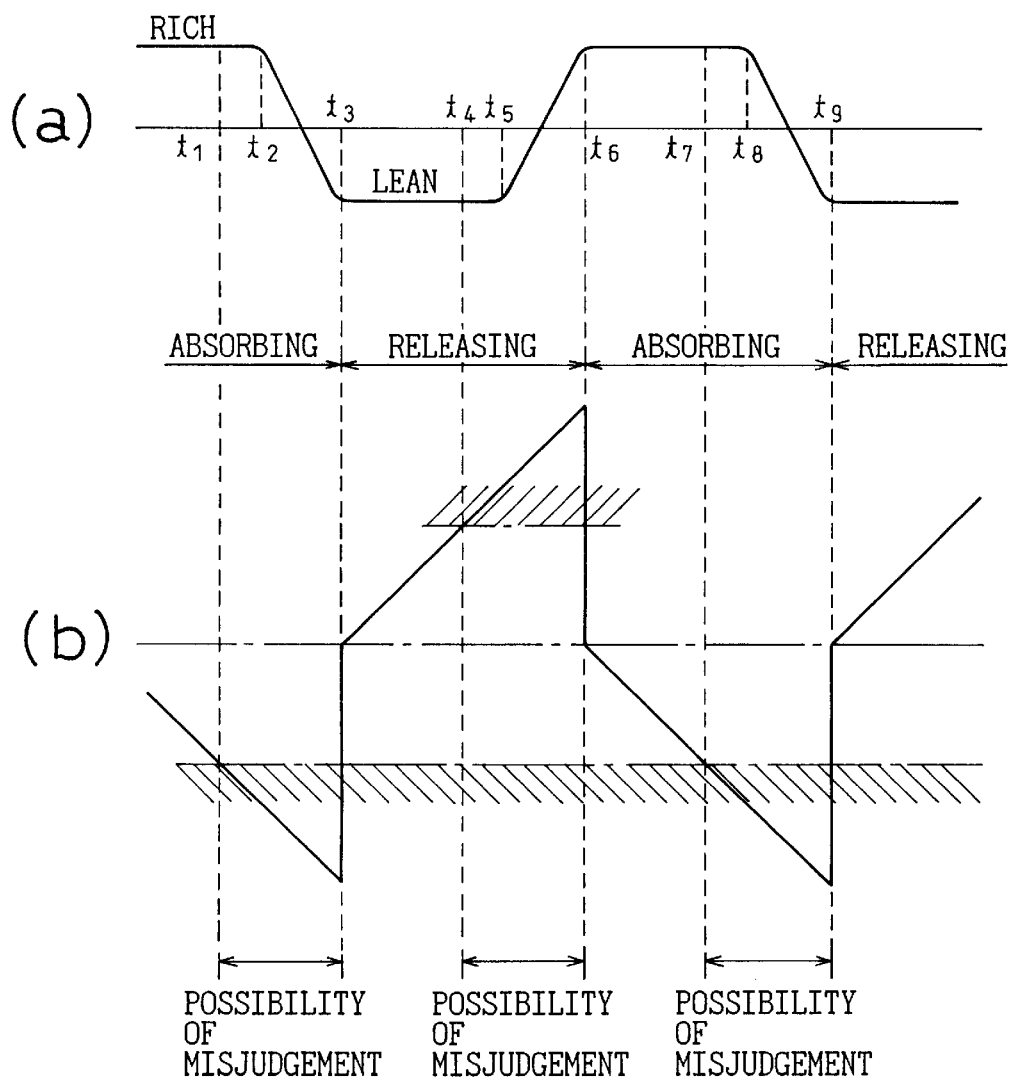
FIG. 2 is a timing chart to explain the problem to be solved.
Figure 3:
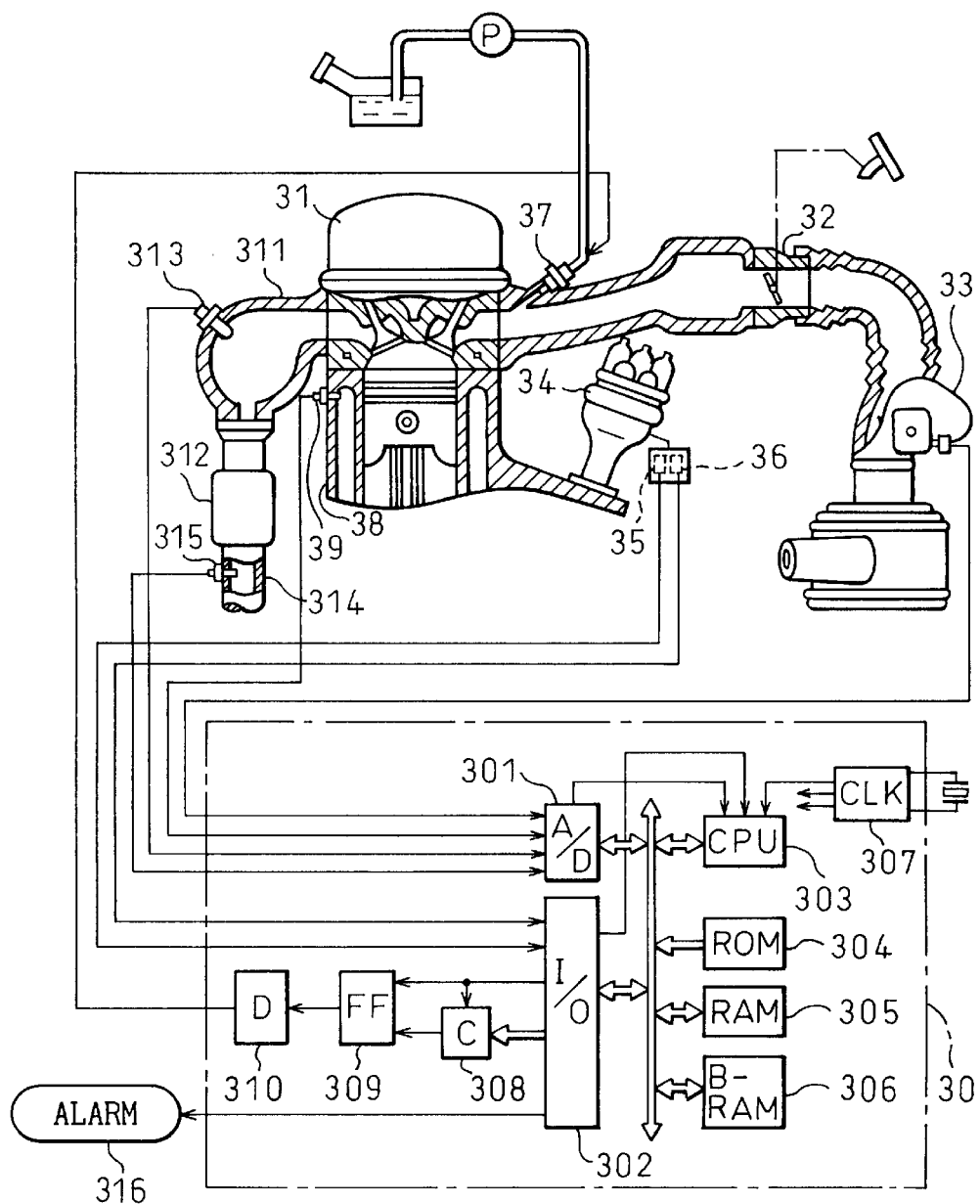
FIG. 3 is a block diagram of an embodiment of the apparatus.

FIG. 3 is a block diagram of an embodiment of an apparatus for detecting the deterioration of a converter according to the present invention. An air flow meter 33 is installed in the intake pipe 32 of an internal combustion engine 31. The air flow meter 33 measures intake air-flow rate, and outputs a voltage signal proportional to the intake air-flow rate using a potentiometer. This voltage signal is supplied to an A/D converter 301 of an engine control unit (ECU) 30.

A reference position sensor 35 which generates a reference position pulse every fixed cam angle, for example 720° CA, and a crank angle sensor 36 which generates a crank angle pulse every 30° CA are installed in the distributor 34. These pulses are supplied to an I/O interface 302 of the ECU 30, and the crank angle pulse is also supplied to the interrupt terminal of CPU 303.

A fuel injection valve 37 is installed in the intake pipe 32 for injecting fuel supplied from a fuel system.

A temperature sensor 39 is installed on the water-jacket 38 of the engine 31 for detecting the coolant temperature THW, and outputs a voltage signal proportional to the coolant temperature THW to the A/D converter 301 of the ECU 30.

At the downstream of the exhaust manifold 311 of the engine 31, a three-way catalytic converter 312 which purifies harmful unburned combustibles in the exhaust gas, that is, HC, CO and $NO_x$ is arranged. The exhaust gas purified by the converter is discharged into the air.

An upstream air-fuel ratio sensor 313 is arranged between the exhaust manifold 311 and the converter 312, and a downstream $O_2$ sensor 315 is arranged in the exhaust pipe 314 of the downstream of the converter 312. The upstream air-fuel ratio sensor 313 outputs a voltage signal proportional to residual $O_2$ density in the exhaust gas, and the downstream $O_2$ sensor 315 outputs a binary signal in accordance with residual $O_2$ density of the exhaust gas. These signals are supplied to the A/D converter 301 of the ECU 30.

The ECU 30 is a micro-computer system, and has not only the A/D converter 301, the I/O interface 302 and CPU 303, but also ROM 304, RAM 305, a battery back-up memory B-RAM 306 and a clock 307.

A down-counter 308, a flip-flop 309 and a driver 310 are used for driving the fuel injection valve 37. When the amount of fuel FI injected to the engine is calculated in a fuel injection controlling routine which is explained later, the down-counter 308 and the flip-flop 309 are activated and the driver 310 opens the fuel injection valve 37. The down-counter 308 is incremented by the clock pulse from the clock 307 and the flip-flop 309 is reset when "1" is output from the carry-out terminal of the down-counter 308. Then the driver 310 closes the fuel injection valve 37. Therefore, the amount of fuel supplied to the combustion camber of the engine 10 is controlled at FI.

Further, an alarm 316 is connected to the I/O interface 302, and it is activated when the converter is considered to be deteriorated.

An air flow rate Q measured by an air-flow meter 33 and a coolant temperature THW measured by a temperature sensor 39 are fetched by an A/D conversion routine executed every fixed period. That is, the air flow rate Q and the coolant temperature THW are stored in RAM 305 are renewed every fixed period.

Moreover, a speed Ne is calculated every interruption of the crank angle sensor 36 and is stored in a fixed address of the RAM 305.

Figure 4:
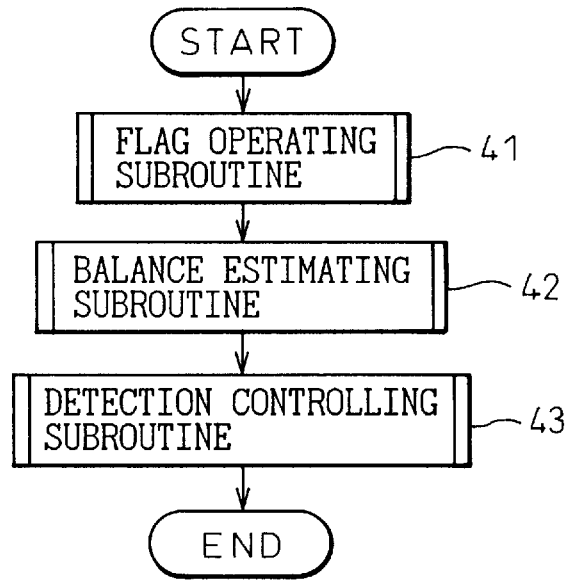
FIG. 4 is a flowchart of a main deterioration detecting routine.

FIG. 4 is a flowchart of the main deterioration detecting routine executed in the ECU 30. A flag operation subroutine is executed at step 41, a balance estimating subroutine is executed at step 42, and a detection controlling subroutine is executed at step 43. Each subroutine is explained in detail hereafter.

Figure 5:
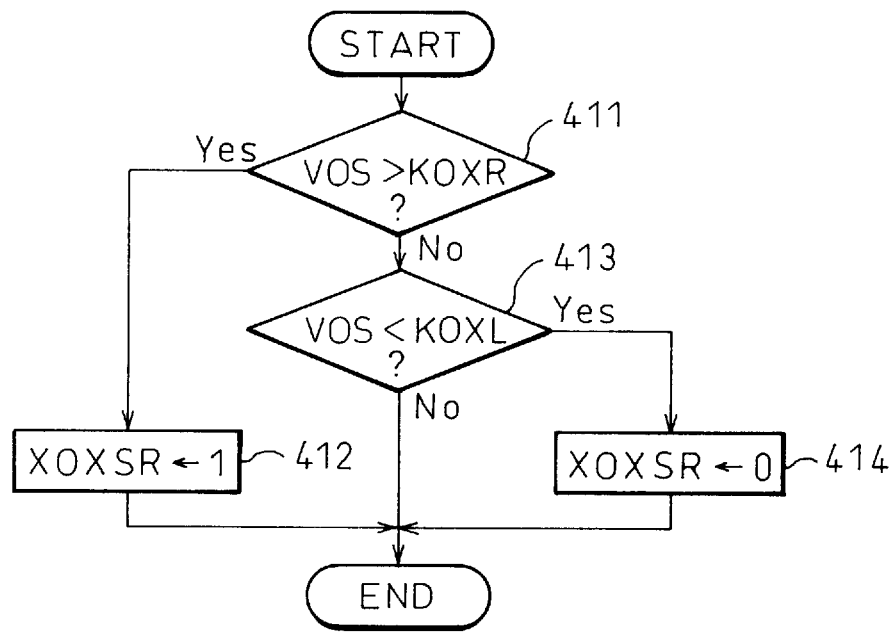
FIG. 5 is a flowchart of a flag operating subroutine.

FIG. 5 is a flowchart of the flag operating subroutine executed in step 41, and the purpose of this subroutine is to give a hysteresis characteristic for stabilizing a reversal of the output of the downstream $O_2$ sensor 315.

That is, this subroutine prevents a misjudgement from being caused when the deterioration is frequently detected due to the frequent resets of the parameter which represents the oxygen balance of the converter, because the output of the downstream $O_2$ sensor 315 easily reverses if the hysteresis characteristic is not applied when the air-fuel ratio exists near the stoichiometric air-fuel ratio.

It is determined whether or not the output of the downstream $O_2$ sensor 315 VOS is higher than the rich threshold KOXR at step 411. When the determination at step 411 is affirmative, this routine is terminated after the downstream air-fuel flag XOXSR is set to "1" at step 412.

Conversely, when the determination at step 411 is negative, the control proceeds to step 413. It is determined whether or not the output of the downstream $O_2$ sensor 315 VOS is lower than the lean threshold KOXL at step 413. When the determination at step 413 is affirmative, this routine is terminated after the downstream air-fuel flag XOXSR is set is "0" at step 414. When the determination is negative, this routine is directly terminated.

Figure 6:
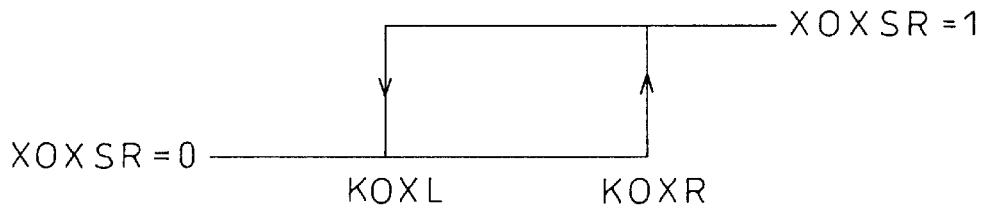
FIG. 6 is a graph to show a hysteresis characteristic.

FIG. 6 shows the hysteresis characteristic, and the downstream air-fuel flag ratio XOXSR is set to "1" when the output of the downstream $O_2$ sensor 315 VOS is higher than the rich threshold KOXR. Conversely, it is set to "0" when VOS is lower than the lean threshold KOXL.

When the output of the downstream $O_2$ sensor 315 VOS changes from the rich state to the lean state, the downstream air-fuel ratio flag XOXSR is maintained at "1" until VOS reaches the lean threshold KOXL. When the output of the downstream $O_2$ sensor 315 VOS changes from the lean state to the rich state, the downstream air-fuel ratio flag XOXSR is maintained at "0" until VOS reaches the rich threshold KOXR.

Figure 7:
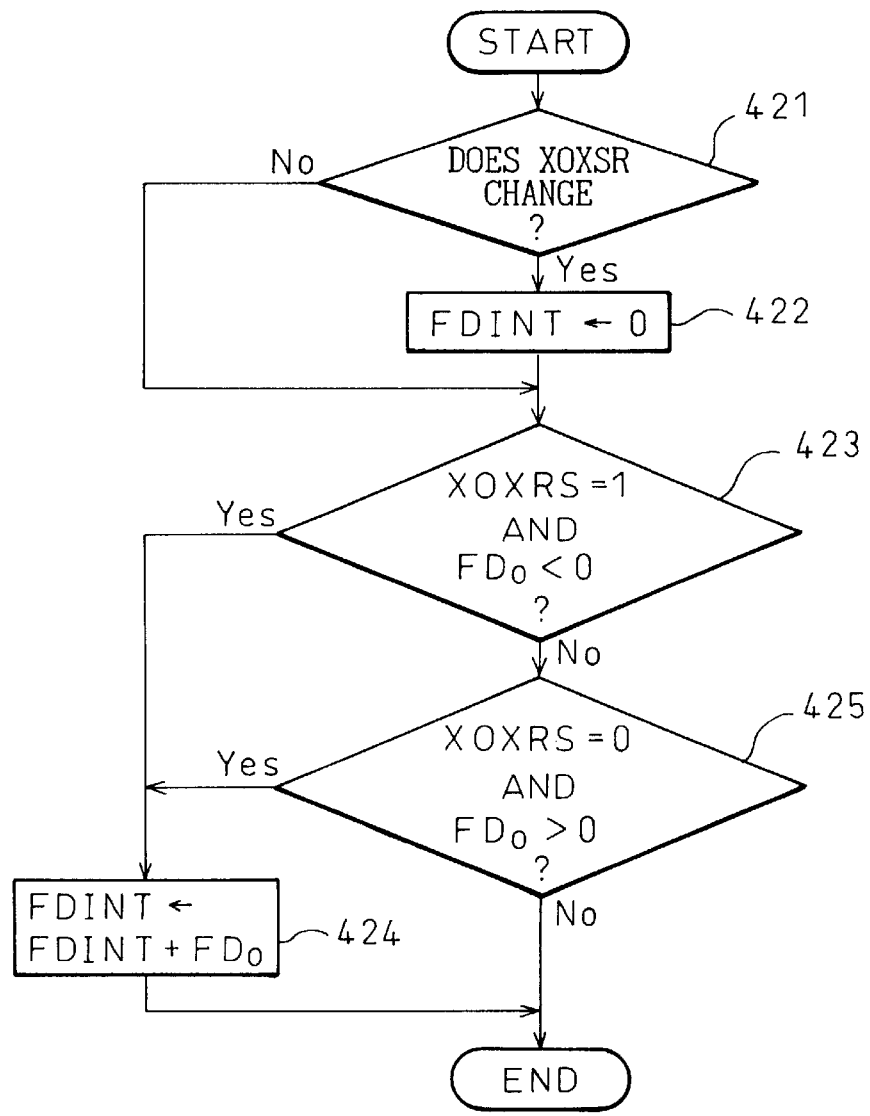
FIG. 7 is a flowchart of a balance estimating subroutine.

FIG. 7 is a flowchart of the balance estimating subroutine executed at step 42. This subroutine is executed for estimating the oxygen balance in accordance with the integral of the fuel difference.

When the downstream $O_2$ sensor 315 detects the rich state, the air-fuel ratio control system decreases the amount of fuel to less than that required to maintain the air-fuel ratio at the stoichiometric air-fuel ratio. In this state, the converter continues to absorb the residual oxygen in the exhaust gas. Therefore, the integral of the fuel difference corresponds to the amount of the absorbed oxygen in the converter.

Conversely, when the output of the downstream $O_2$ sensor 315 is lean, the air-fuel ratio control system increases the amount of fuel to more than that required to maintain the air-fuel ratio at the stoichiometric air-fuel ratio. In this state, the converter continues to release the absorbed oxygen. Therefore, the integral of the fuel difference corresponds to amount of the released oxygen from the converter. Therefore, the oxygen balance can be estimated based on the integral of the fuel difference.

It is determined whether or not the downstream air-fuel ratio flag XOXSR changes at step 421.

When the determination at step 421 is affirmative, that is, when the flag XOXSR changes, the control proceeds to step 423 after the integral of the fuel difference FDINT is set to "0.0" at step 422. Note, when the determination at step 421 is negative, that is, when the flag XOXSR does not change, the control directly proceeds to step 423.

It is determined whether or not XOXSR=1 and $FD_0<0$, that is, whether or not the downstream air-fuel sensor 315 detects the rich state and fuel is injected so that the air-fuel ratio is controlled toward the lean state at step 423.

When the determination at step 423 is affirmative, that is, when the air-fuel ratio detected by the downstream $O_2$ sensor 315 does not contradict with amount of the injected fuel, this routine is terminated after the integral of the fuel difference FDINT is renewed in accordance with the following equation at step 424.

$$FDINT=FDINT+FD_0$$

It is determined whether or not XOXSR=0 and $FD_0>0$, that is, whether or not the downstream air-fuel sensor 315 detects the lean state and fuel is injected so that the air-fuel ratio is controlled toward the rich state at step 425.

When the determination at step 425 is affirmative, that is, when the air-fuel ratio detected by the downstream $O_2$ sensor 315 does not contradict with amount of the injected fuel, the control proceeds to step 424. Note, when the determination at step 425 is negative, the routine is directly terminated.

Figure 8:
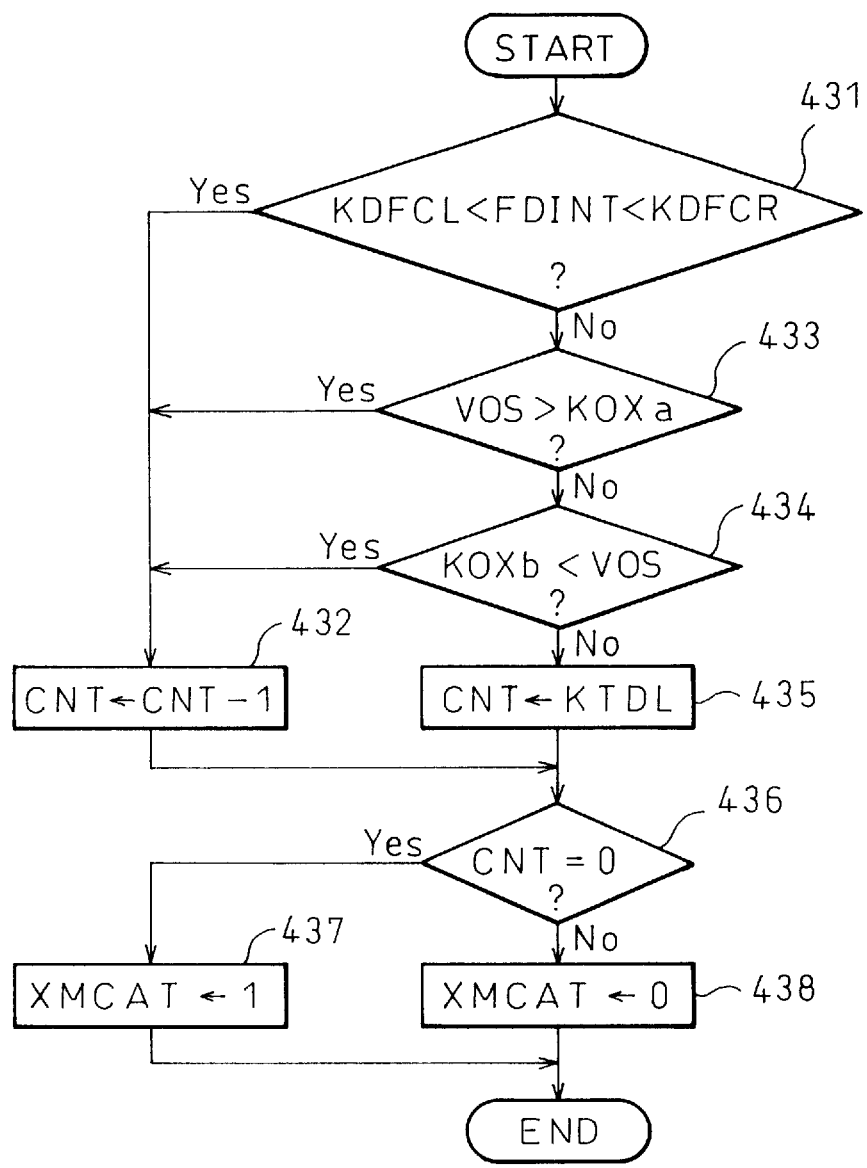
FIG. 8 is a flowchart of a detection controlling subroutine.

FIG. 8 is a flowchart of the detection controlling subroutine executed at step 43 of the main deterioration detecting routine. It is determined whether or not the fuel difference FDINT exists between a fixed lower limit KDFCL and a fixed upper limit KDFCR.

The determination at step 431 is affirmative when the fuel difference FDINT exists between the lower limit KDFCL and the upper limit KDFCR, and the control proceeds to step 436 after the counter CNT is decremented to count the deterioration detecting interval.

The determination at step 431 is negative because it is considered that the oxygen absorbing power or the oxygen releasing power exceeds the limits when the fuel difference FDINT does not exist between the lower limit KDFCL and the upper limit KDFCR. It is determined whether or not the output of the downstream $O_2$ sensor 315 VOS is higher than the output upper limit KOXa at step 433 and it is determined whether or not the output of the downstream $O_2$ sensor 315 VOS is lower than the output lower limit KOXb at step 434.

The determination at step 433 or 434 is affirmative when the output of the downstream $O_2$ sensor 315 VOS is higher than the output upper limit KOXa or it is lower than the output lower limit KOXb because the converter can actually function normally though the oxygen absorbing power and the oxygen releasing power deviate from fixed limits. The control proceeds to step 436 after the counter CNT is decremented at step 432. This is intended to increase the opportunities for detecting the deterioration of the converter using the margin which is generally given to the limits of the oxygen absorbing power and the oxygen releasing power.

All determinations at step 431, 433 and 434 are negative when the output of the downstream $O_2$ sensor 315 VOS changes and the oxygen absorbing power and the oxygen releasing power actually deviate from the limits. In this case, the control proceeds to step 436 after the counter CNT is set to a fixed number KTDL in order to inhibit the detection for the deterioration at step 435.

It is determined whether or not the counter CNT is "0" at step 436. When the determination is affirmative, that is, when a fixed detecting interval has elapsed, this routine is terminated after the detecting flag XMCAT is set to "1" to execute the detection at step 437 because a misjudgement is never caused.

Conversely, when the determination at step 436 is negative, that is, when the output of the downstream $O_2$ sensor 315 VOS enters between the output upper limit KOXa and the output lower limit KOXb after it is determined that the oxygen absorbing power and the oxygen releasing power have deviated outside the limits, or when the deterioration detecting interval is not elapsed though the detection is permitted, this routine is terminated after the detecting flag XMCAT is set to "0" at step 438.

Figure 9:
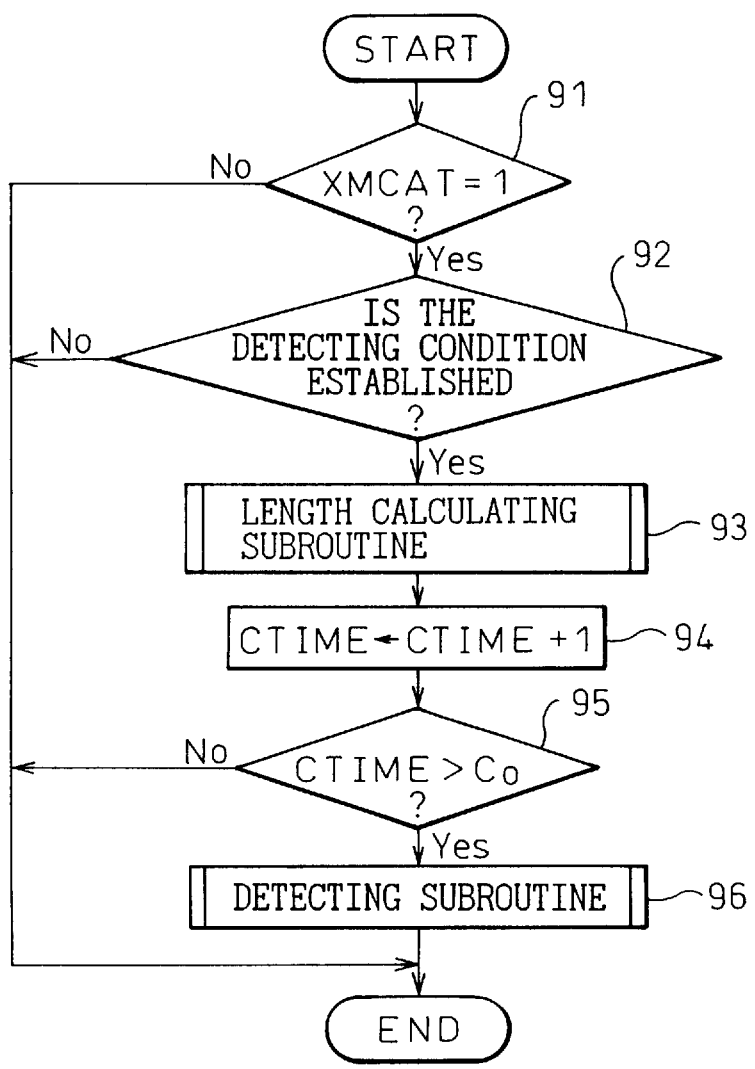
FIG. 9 is a flowchart of a detection executing routine.

FIG. 9 is a flowchart of a detection executing routine executed in ECU 30. It is determined whether or not the detecting flag XMCAT is "1" at step 91, and this routine is directly terminated when the determination is negative.

When the determination is affirmative, the control proceeds to step 92 where it is determined whether or not the detecting condition is established.

The deterioration of the converter is detected when the all of the following conditions are established.

(1) The air-fuel ratio control with the upstream air-fuel ratio sensor 313 is being executed. This condition is explained in detail hereafter.

(2) The air-fuel ratio control with the downstream $O_2$ sensor 315 is being executed. This condition is explained in detail hereafter.

(3) The output of the engine is higher than a fixed load.

When the determination at step 92 is negative, that is, when any one of the above three conditions is not established, the routine is directly terminated without executing the detection.

Conversely, when the determination at step 92 is affirmative, that is, when all above-described conditions are established, the control proceeds to step 93.

The lengths of the response curves of the air-fuel ratio sensors are calculated at step 93, and the details is explained hereafter.

The detecting interval counter CTIME for counting the detecting interval is incremented at step 94, and it is determined whether or not the counter CTIME counts more than a fixed number Co at step 95.

When the determination at step 95 is negative, that is, when a fixed detecting interval is not elapsed, this routine is directly terminated.

Conversely, when the determination is affirmative at step 95, that is, when a fixed detecting interval has elapsed, this routine is terminated after the detecting subroutine is executed at step 96. Note, the detecting subroutine is explained in detail hereafter.

Figure 10:
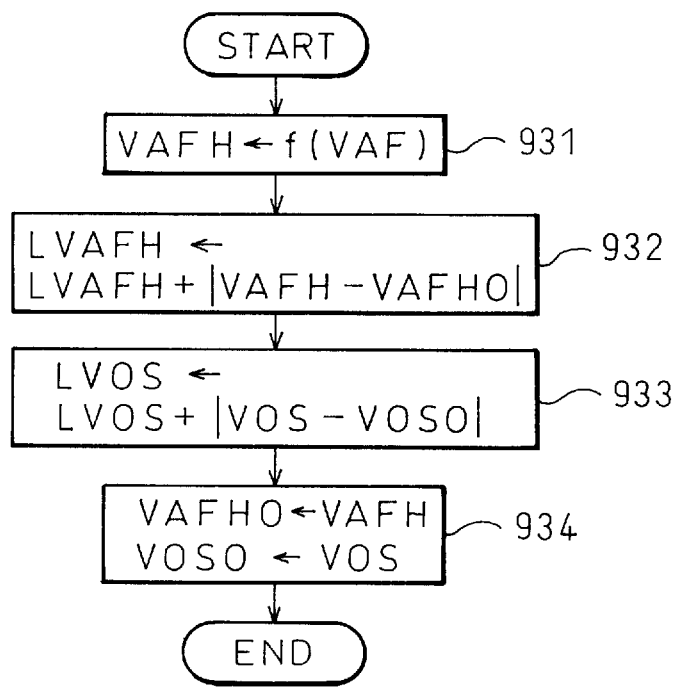
FIG. 10 is a flowchart of a length calculating subroutine.

FIG. 10 is a flowchart of the length calculating subroutine executed at step 93. The output of the upstream air-fuel ratio sensor 313 VAF is converted to the output for calculating the length VAFH at step 931.

$$VAFH-f(VAF)$$

The length of the response curve of the output of the upstream air-fuel ratio sensor 313 LVAFH is calculated in accordance with the output for calculating the length LAFH using the following equation.

$$LVAFH-LVAFH+|VAFH-VAFHO|$$

Where, VAFHO is the output for calculating the length calculated at the previous execution.

Next, the length of the response curve of the output of the downstream $O_2$ sensor 315 LVOS is calculated in accordance with the output of the downstream $O_2$ sensor 315 VOS using the following equation.

$$LVOS-LVOS+|VOS-VOSO|$$

Where, VOSO is the output of the downstream $O_2$ sensor 315 used at the previous execution.

Finally, this routine is terminated after the values calculated at previous execution are renewed for the next execution as following.

$$VAFHO-VAFH$$
$$VOSO-VOS$$

Figure 11:
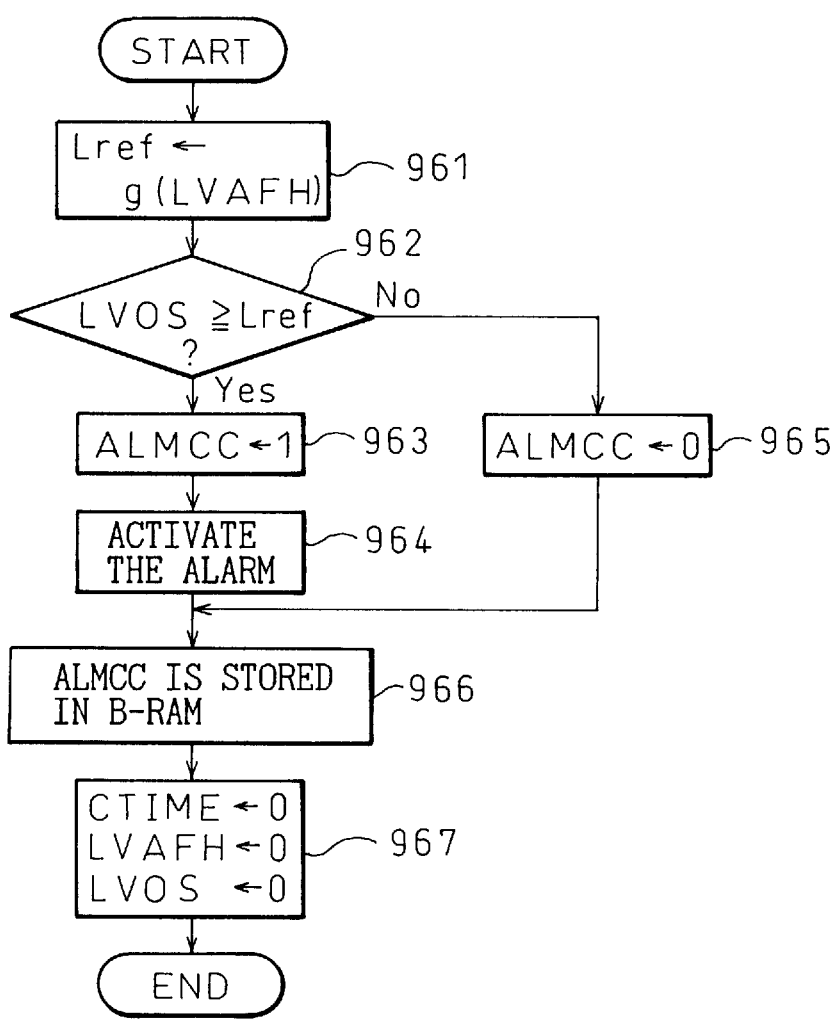
FIG. 11 is a flowchart of a detecting subroutine.

FIG. 11 is a flowchart of a detecting subroutine executed at step 96. The threshold value Lref for detecting the deterioration is determined in accordance with the length of the response curve of the upstream air-fuel ratio sensor 313 LVAFH.

$$Lref-f(LVAFH)$$

It is determined whether or not the length of the response curve of the downstream $O_2$ sensor 315 LVOS is longer than the threshold value Lref, that is, whether or not the converter has already deteriorated.

When the determination at step 962 is affirmative, that is, when it is determined that the converter has already deteriorated, the control proceeds to step 966 after the alarm flag ALMCC is set to "1" at step 963 and the alarm is activated at step 964.

Conversely, when the determination is negative at step 962, that is, when it is determined that the converter has not deteriorated, the control proceeds to step 966 after the alarm flag ALMCC is set to "0" at step 965.

The alarm flag ALMCC is stored in the B-RAM 306 for the maintenance at step 966.

This subroutine is terminated after the detecting interval counter CTIME, the length of the response curve of the output of the upstream air-fuel ratio sensor 313 LVAFH and the length of the response curve of the downstream $O_2$ sensor 315 LVOS are reset for next execution at step 967.

Figure 12:
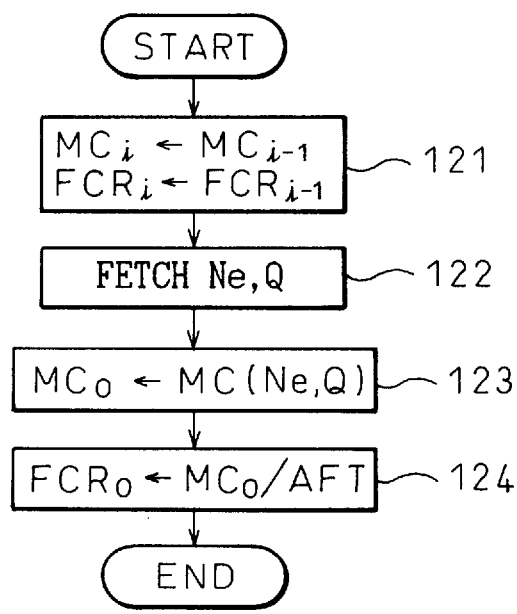
FIG. 12 is a flowchart of a target fuel amount calculating routine.

FIG. 12 is a flowchart of a target fuel amount calculating routine executed in the ECU 30, and this routine is executed every fixed crank angle.

Amount of air in the cylinder MCi and amount of fuel in the cylinder FCRi which are calculated in the previous execution are shifted to Mci-1 and FCRi-1 respectively at step 121 in order to calculate the present $MC_0$ and $FCR_0$ in this execution.

The engine speed Ne and the intake air flow rate Q which are stored in the RAM 305 are fetched at step 122.

The present amount of air in the cylinder $MC_0$ is calculated as the function of the engine speed Ne and the intake air flow rate Q.

$$MC_0-MC (Ne,Q)$$

This routine is terminated after the present amount of fuel FCRO, that is, the amount of fuel required to maintain the air-fuel ratio of the engine at the stoichiometric air-fuel ratio is calculated at step 124.

$$FCR_0=MC_0/AFT$$

Where AFT is the stoichiometric air-fuel ratio (14.7).

Figure 13:
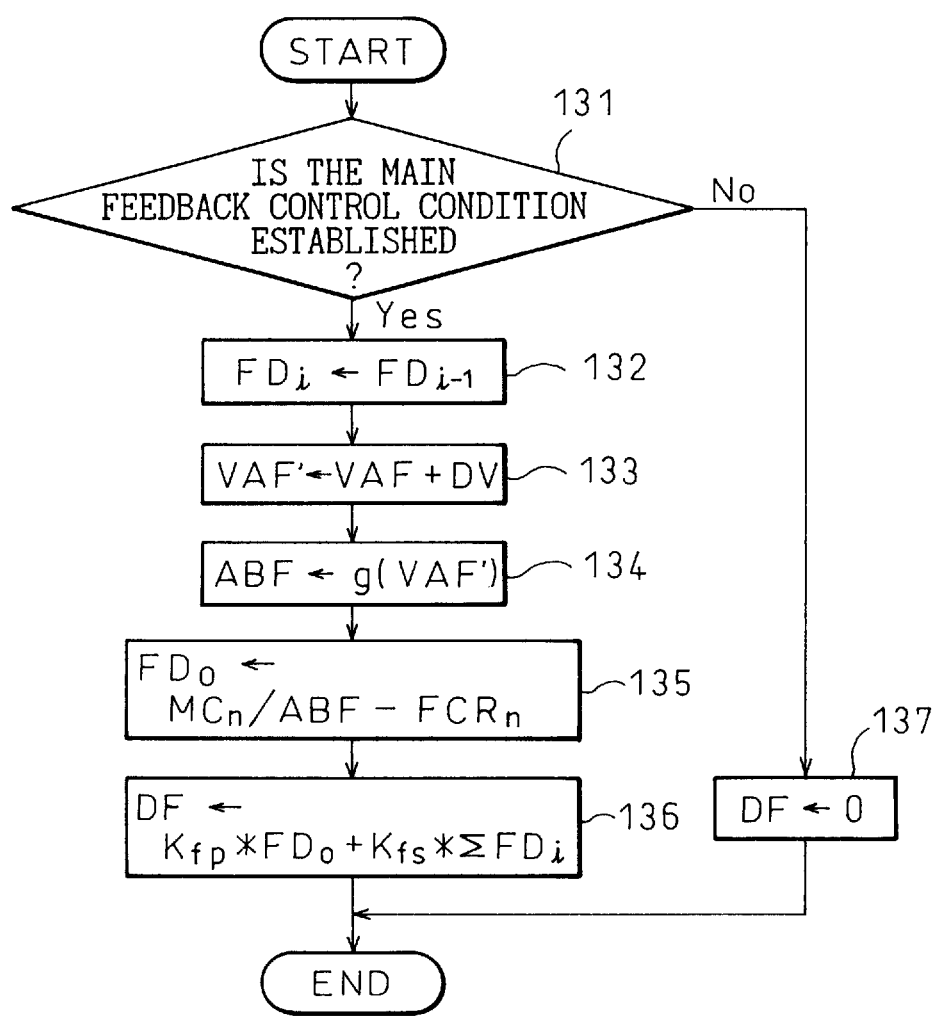
FIG. 13 is a flowchart of a main air-fuel ratio feedback control routine.

FIG. 13 is a flowchart of a main air-fuel ratio feedback control routine. This routine is executed every fixed predetermined interval, for example, 4 ms.

It is determined whether or not a main feedback control condition is established at step 131.

The feedback control with the upstream air-fuel ratio sensor 313 is permitted when all of the following conditions are established.

(1) The coolant temperature is higher than a fixed temperature.

(2) The engine is not in the starting state.

(3) The fuel is not being increased.

(4) The output of the upstream air-fuel ratio sensor has reversed at least one time.

(5) The fuel is not being cut.

When all above conditions are established, that is, when the main feedback control is permitted, the determination at step 131 is affirmative, and the control proceeds to step 132 where FDi calculated at previous execution is shifted to FDi−1 in order to calculate the present fuel amount difference $FD_0$.

The output of the upstream air-fuel ratio sensor 313 VAF is corrected by the voltage correcting factor DV which is calculated in the auxiliary air-fuel ratio feedback control routine (explained in detail later) at step 133.

$$VAF'=VAF+DV$$

The present actual air-fuel ratio ABF is calculated in accordance with the corrected output of the upstream air-fuel ratio sensor 313 VAF' at step 134.

$$ABF=g(VAF')$$

The present fuel difference FDo is calculated in accordance with not only the amount of air in the cylinder MCn and the amount of fuel in the cylinder FCRn which have been calculated at n'th previous execution, but also the present actual air-fuel ratio ABF.

$$FD_0=MCn/ABF-FCRn$$

Note, the reason why MCn and FCRn are used for calculating for the present fuel difference $FD_0$ is to compensate for the transit time required for the exhaust gas to move from the cylinder to the upstream air-fuel ratio sensor 313.

Finally this routine is terminated after the fuel correction factor DF is calculated using the following equation at step 136.

$$DF=kpf*FD_0+kfs*\Sigma FDi$$

Where, kpf is a proportional gain, and kfs is an integral gain.

Note, when at least one of the above conditions is not established, the determination at step 131 is negative, and this routine is terminated after the fuel correction factor DF is set to "0" at step 137.

Figure 14:
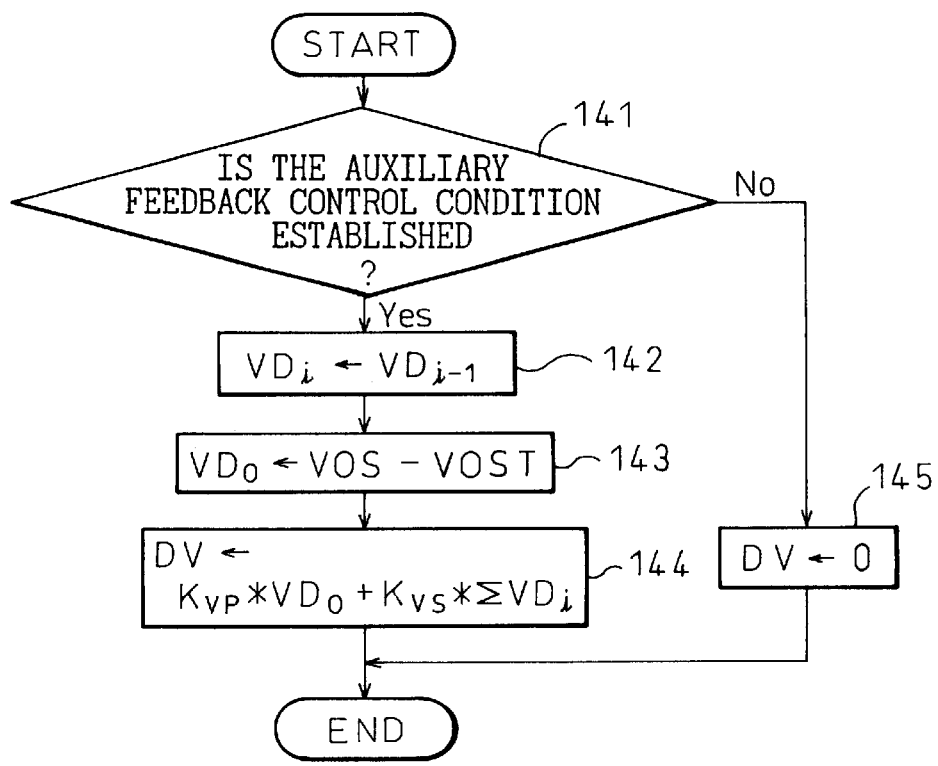
FIG. 14 is a flowchart of an auxiliary air-fuel ratio feedback control routine.

FIG. 14 is the flowchart of an auxiliary air-fuel ratio feedback control routine. This routine is executed every fixed time interval which is longer than that of the main air-fuel ratio feedback control routine.

It is determined whether or not an auxiliary feedback control condition is established.

The auxiliary feedback control with the downstream $O_2$ sensor is permitted when the above-mentioned main feedback control condition is established.

When the auxiliary feedback control is permitted, the determination at step 141 is affirmative, and the control proceeds to step 142, where the voltage difference VDi is replaced with VDi−1 in order to calculate the present voltage difference as $VD_0$.

The present voltage difference $VD_0$ between the actual output of the downstream $O_2$ sensor 315 VOS and the target of the downstream $O_2$ sensor VOST is calculated using the following equation at step 143.

$$VD_0=VOS-VOST$$

Finally, this routine is terminated after the voltage collection factor DV using the following equation at step 144.

$$DV=kvf*VD_0+kvs*\Sigma VDi$$

Where, kvf is a proportional gain, and kvs is an integral gain.

Note, when any auxiliary feedback control condition is not established, the determination at step 141 is negative, and this routine is terminated after the voltage correction factor DV is set to "0" at step 145.

Figure 15:
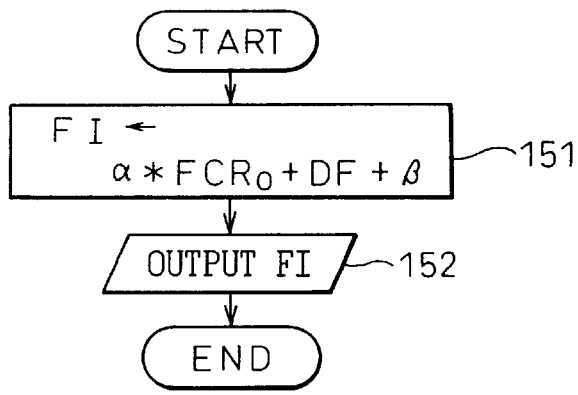
FIG. 15 is a flowchart of a fuel injection controlling routine.

FIG. 15 is a flowchart of a fuel injection controlling routine which controls amount of fuel injected to the engine. This routine is executed every fixed crank angle. At first, amount of injected fuel FI is calculated in accordance with the target amount of fuel supplied to the cylinder FCRO calculated in the target fuel amount calculating routine and the fuel correction factor DF at step 151.

$$FI=\alpha*FCR_0+DF+\beta$$

Where $\alpha$ and $\beta$ are correction factors which are determined in accordance with other operating parameters.

This routine is terminated after amount of injected fuel FI is set to the down-counter 308 at step 152.

Figure 16:
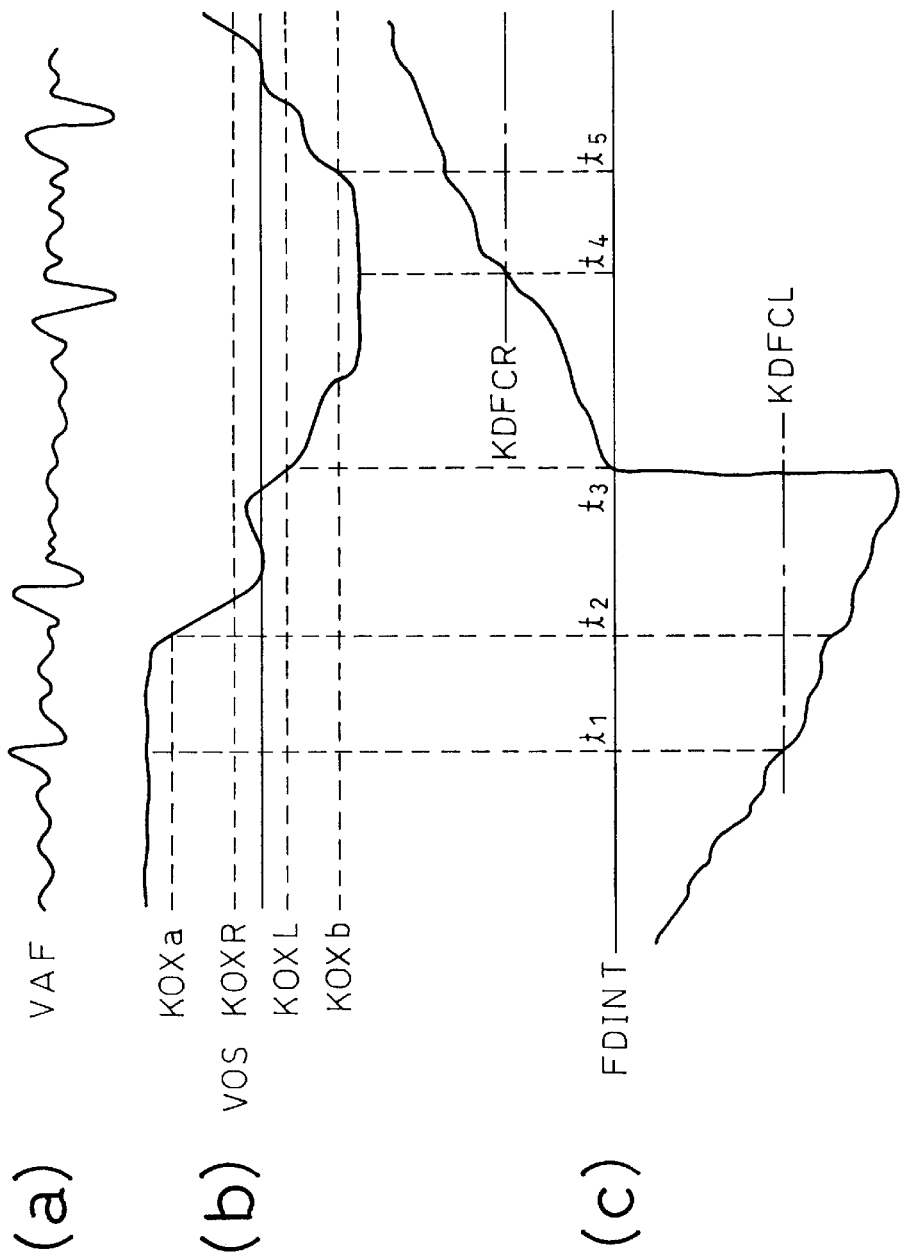
FIG. 16 is a timing chart to explain the operation of the first embodiment.

FIG. 16 is a timing chart to explain the operation of this embodiment. The abscissas denote time, and waveforms denote the output of the upstream air-fuel ratio sensor 313 VAF, the output of the downstream $O_2$ sensor VOS and the integral of the fuel difference FDINT respectively.

Before time $t_1$, the integral of the fuel difference FDINT exists between a fixed upper limit KDFCR and a fixed lower limit KDFCL, and the detection for deterioration is permitted because the oxygen absorbing power is not yet saturated.

At time $t_1$, the integral of the fuel difference FDINT deviates from the lower limit KDFCL, but detection is permitted to increase opportunity for detecting the deterioration because the output of the downstream $O_2$ sensor VOS is higher than the output upper limit KOXa and it is considered that the output of the downstream sensor does not reverse before time $t_2$. Conversely, because the output of the downstream $O_2$ sensor VOS changes from the rich state to the lean state after time $t_2$, the detection is inhibited in order to prevent the misjudgement from being caused.

Between time $t_3$ and time $t_4$, the detection is permitted because the oxygen releasing power does not reach the limit.

At time $t_4$, the integral value of the fuel difference FDINT deviates from the upper limit KDFCR, but the detection is permitted to increase opportunity for detecting the deterioration because the output of the downstream $O_2$ sensor VOS is lower than the output upper limit KOXa and it is considered that it does not change before time $t_5$. Conversely, because the output of the downstream $O_2$ sensor VOS changes from the lean state to the rich state after time $t_5$, the detection is inhibited in order to prevent the misjudgement from being caused.

In the above-mentioned embodiment, the deterioration of the converter is detected in accordance with the length of the response curve of the output of the upstream air-fuel ratio sensor 313 and that of the downstream $O_2$ sensor 315. However, it can be detected in accordance with the frequency of deviating from the upper limit KDFCR or the lower limit KDFCL between the previous change of the output of the downstream $O_2$ sensor and the present change.

Figure 17:
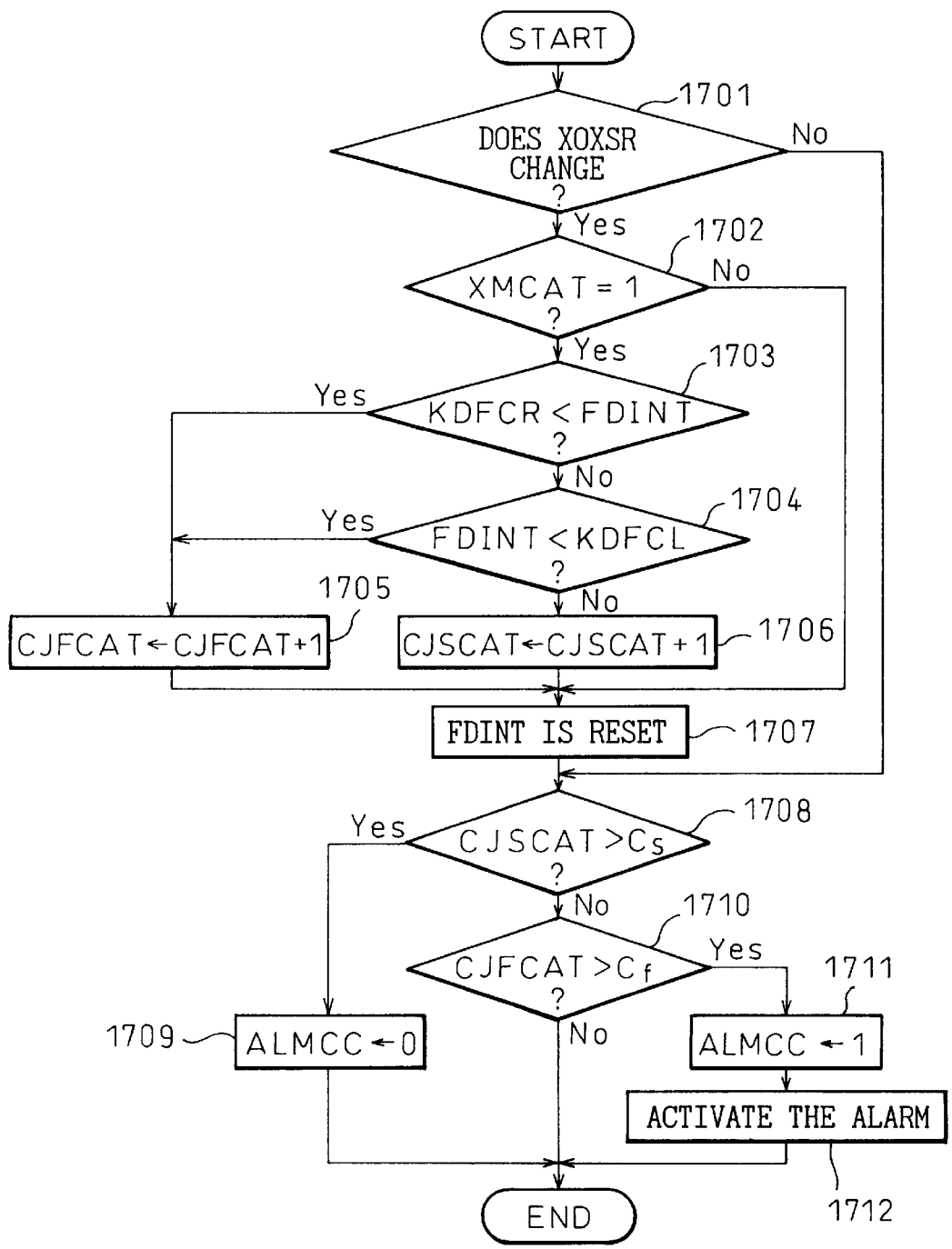
FIG. 17 is a flowchart of the second detection executing routine.

FIG. 17 is a flowchart of the second detection executing routine and this routine is executed instead of the detection executing routine shown in FIG. 9, the length calculating subroutine shown in FIG. 10 and the detecting subroutine shown in FIG. 11.

It is determined whether or not the air-fuel ratio flag XOXSR operated in the flag operating routine shown in FIG. 5 changes at step 1701.

When the determination at step 1701 is affirmative, that is, when XOXSR changes, the control proceeds to step 1702, where it is determined whether or not the detecting flag XMCAT is "1", that is, whether or not the detection is permitted.

When the determination at step 1702 is affirmative, that is, when the detection is permitted, it is determined whether or not the integral of the fuel difference FDINT is larger than the upper limit KDFCR at step 1703 and it is determined whether or not the integral of the fuel difference FDINT is smaller than the lower limit KDFCL at step 1704.

When the integral of the fuel difference FDINT deviates from the upper limit KDFCR or the lower limit KDFCL, the determinations at step 1703 or step 1704 are affirmative, and the control proceeds to step 1707 after the abnormal flag CJFCAT is incremented at step 1705.

Conversely, when the integral of the fuel difference FDINT exists between the upper limit and the lower limit, the determinations at step 1703 and step 1704 are negative and the control proceed 1707 after the normal flag CJSCAT is incremented at step 1706.

Note, the determination at step 1702 is negative, that is, when the detection is not permitted, the control directly proceeds to step 1707.

After the integral of the fuel difference FDINT is reset at step 1707, the control proceeds to step 1708. Note, when the determination at step 1701 is negative, that is when XOXSR does not change, the control also proceeds to step 1708.

At step 1708, it is determined whether or not the normal counter CJSCAT is larger than a fixed number Cs at step 1708.

When the determination at step 1708 is affirmative, this routine is terminated after the alarm flag ALMCC is set to "0" at step 1709.

When the determination at step 1708 is negative, it is determined whether or not the abnormal counter CJFCAT is larger than a fixed number Cf at step 1710.

When the determination at step 1710 is affirmative, this routine is terminated after the alarm flag ALMCC is set to "1" at step 1711 and the alarm is activated at step 1712.

Note, the determination at step 1710 is negative, this routine is directly terminated.

In the above-mentioned embodiment, the upstream air-fuel ratio sensor 313 is a linear sensor and the downstream sensor 315 is an $O_2$ sensor. This invention can be applied for a double $O_2$ sensor system which is equipped with $O_2$ sensors not only as the downstream sensor but also as the upstream sensor.

In this case, however, the oxygen balance cannot be estimated in accordance with the integral of the fuel difference FDINT because amount of injected fuel is not proportional to the output of the upstream sensor as the output of an $O_2$ sensor is not proportional to amount of the residual oxygen in the exhaust gas.

Therefore, the integral of the difference between the air-fuel ratio correction factor and the air-fuel ratio leaning factor is used for estimating the oxygen balance.

Figure 18:
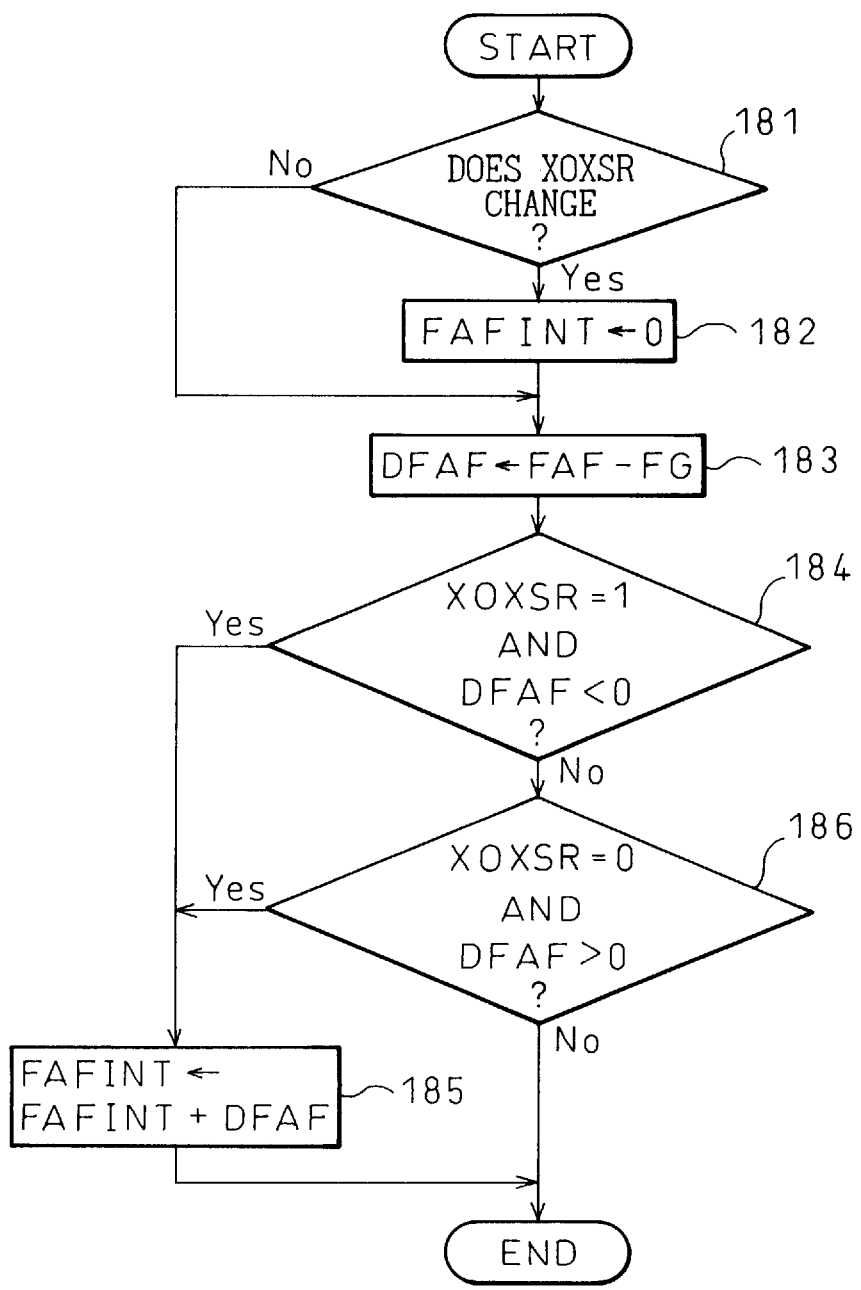
FIG. 18 is a flowchart of the second balance estimating subroutine.

FIG. 18 is a flowchart of the second balance estimating routine which is executed instead of the balance estimating routine shown in FIG. 7. It is determined whether or not the air-fuel ratio flag XOXSR changes at step 181.

When the determination at step 181 is affirmative, that is, when XOXSR changes, the control proceeds to step 183 after the integral of the air-fuel ratio difference FAFINT is reset at step 182. Conversely, when the determination at step 181 is negative, the control directly proceeds to step 183.

The air-fuel ratio difference DFAF between the air-fuel ratio correction factor FAF and the air-fuel ratio leaning factor FG is calculated by the following equation. Note, FAF and FG are explained in detail hereafter.

$$DFAF = FAF - FG$$

It is determined whether or not XOXSR is equal to "1" and DFAF is less than zero at step 184.

When the determination at step 184 is affirmative, the integral of the air-fuel ratio difference FAFINT is renewed using the following equation at step 185.

$$FAFINT = FAFINT + DFAF$$

When the determination at step 184 is negative, it is determined whether or not XOXSR is equal to "0" and DFAF is more than zero at step 186.

When the determination at step 186 is affirmative, FAFINT is renewed at step 185. Note, when the determination at step 186 is negative, this routine directly terminated.

Figure 19:
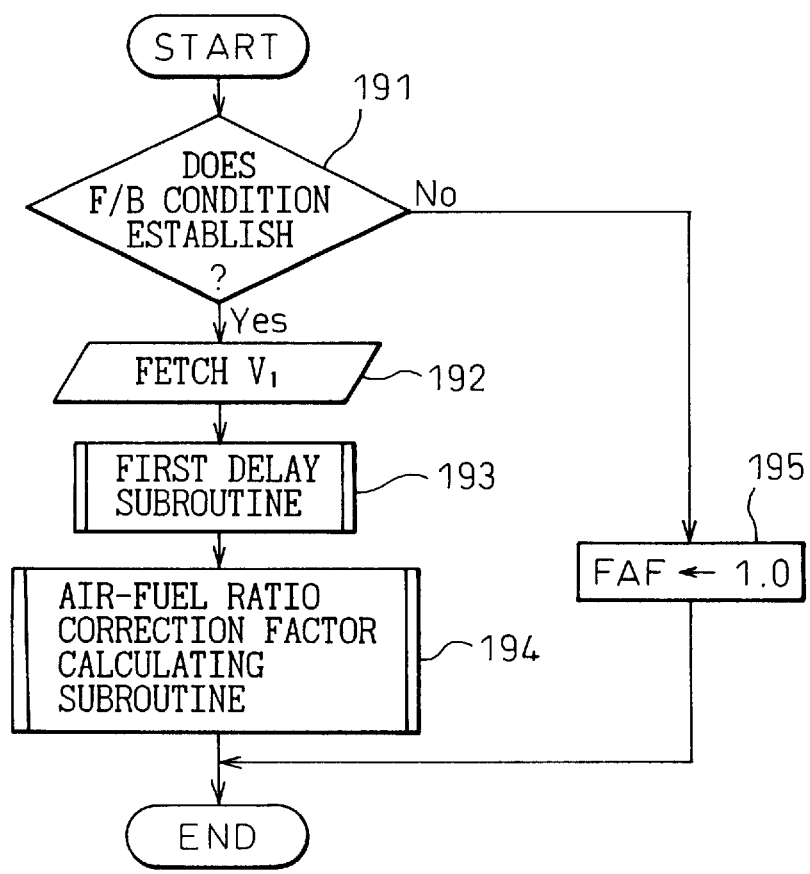
FIG. 19 is a flowchart of the first air-fuel ratio correction factor calculating routine.

FIG. 19 is a flowchart of the first air-fuel ratio correction factor calculating routine which is executed instead of the main air-fuel ratio feedback control routine shown in FIG. 13 to calculate the air-fuel ratio correction factor FAF and the air-fuel ratio leaning factor FG. This routine is executed every fixed interval, for example 4 ms.

It is determined whether or not the condition for executing the feedback control with the upstream $O_2$ sensor 313 is established at step 191.

This condition is already explained using FIG. 13. When this condition is established, that is, when the feedback control with the upstream $O_2$ sensor is permitted, the determination at step 191 is affirmative and the control proceeds to step 192 where the output of the upstream $O_2$ sensor 313 $V_1$ is fetched.

This routine is terminated after the first delay subroutine is executed at step 193 and the air-fuel ratio correction factor calculating subroutine is executed at step 194.

Conversely, when the condition for executing the feedback control with the upstream $O_2$ sensor 313 is not established, the determination at step 191 is negative and this routine is terminated after the air-fuel ratio correction factor FAF is set to "1.0" at step 195.

Figure 20:
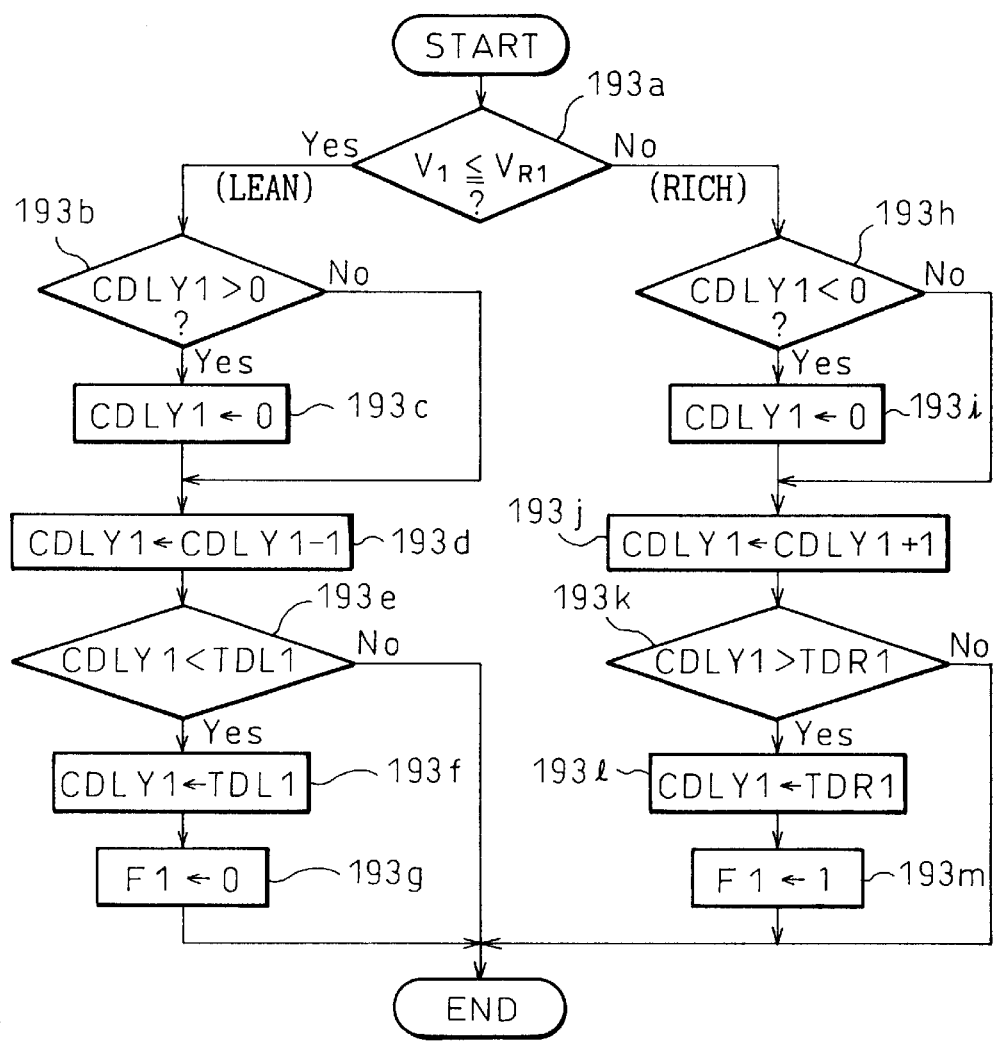
FIG. 20 is a flowchart of the first delay operation subroutine.

FIG. 20 is a flowchart of the first delay subroutine executed at step 193. It is determined whether or not the output of the upstream $O_2$ sensor 313 $V_1$ is higher than the first reference voltage $V_{IR}$ (for example 0.45V), that is, whether or not the air-fuel ratio detected by the upstream $O_2$ sensor 313 is lean at step 193a.

When the determination at step 193a is affirmative, that is, when the air-fuel ratio detected by the upstream $O_2$ sensor 313 is lean, it is determined whether or not the first delay counter CDLY1 is positive at step 193b.

When the determination at step 193b is affirmative, the control proceeds to step 193d after the first delay counter CDLY1 is reset at step 193c. Conversely, when the determination at step 193b is negative, the control proceeds directly to step 193d.

The first delay counter CDLY1 is decremented at step 193d, and it is determined whether or not CDLY1 is less than the first lean delay time TDL1 at step 193e.

When the determination at step 193e is affirmative, that is, when time elapsed is longer than the first lean delay time TDL1 after the output of the upstream $O_2$ sensor 313 reverses, this subroutine is terminated after the first lean delay counter CDLY1 is set to the first lean delay time TDL1 at step 193f and the first air-fuel ratio flag F1 is set to "0" at step 193g. Conversely, when the determination at step 193e is negative, this subroutine is directly terminated.

Note, the first lean delay time TDL1 is used for delaying the change of the first air-fuel ratio flag F1 after the output of the upstream $O_2$ sensor 313 changes from the rich state to the lean state, and is defined as a negative value.

When the determination at step 193a is negative, that is, when the air-fuel ratio detected by the upstream $O_2$ sensor 131 is rich, it is determined whether or not the first delay counter CDLY1 is negative at step 193h.

When the determination at step 193h is affirmative, the control proceeds to step 193j after the first delay counter CDLY1 is reset at step 193i. Conversely, when the determination at step 193h is negative, the control directly proceeds to step 193j.

The first delay counter CDLY1 is incremented at step 193j, and it is determined whether or not CDLY1 is less than the first rich delay time TDR1 at step 193k.

When the determination at step 193k is affirmative, that is, when time is elapsed longer than the first rich delay time TDR1 after the output of the upstream $O_2$ sensor 131 changes, this subroutine is terminated after the first lean delay counter CDLY1 is set to the first rich delay time TDR1 at step 193l and the first air-fuel ratio flag F1 is set to "1" at step 193m. Conversely, when the determination at step 193k is negative, this subroutine is directly terminated.

Note, the first rich delay time TDR1 is used for delaying the change of the first air-fuel ratio flag F1 after the output of the upstream $O_2$ sensor 131 changes from the lean state to the rich state, and is defined as a positive value.

Figure 21:
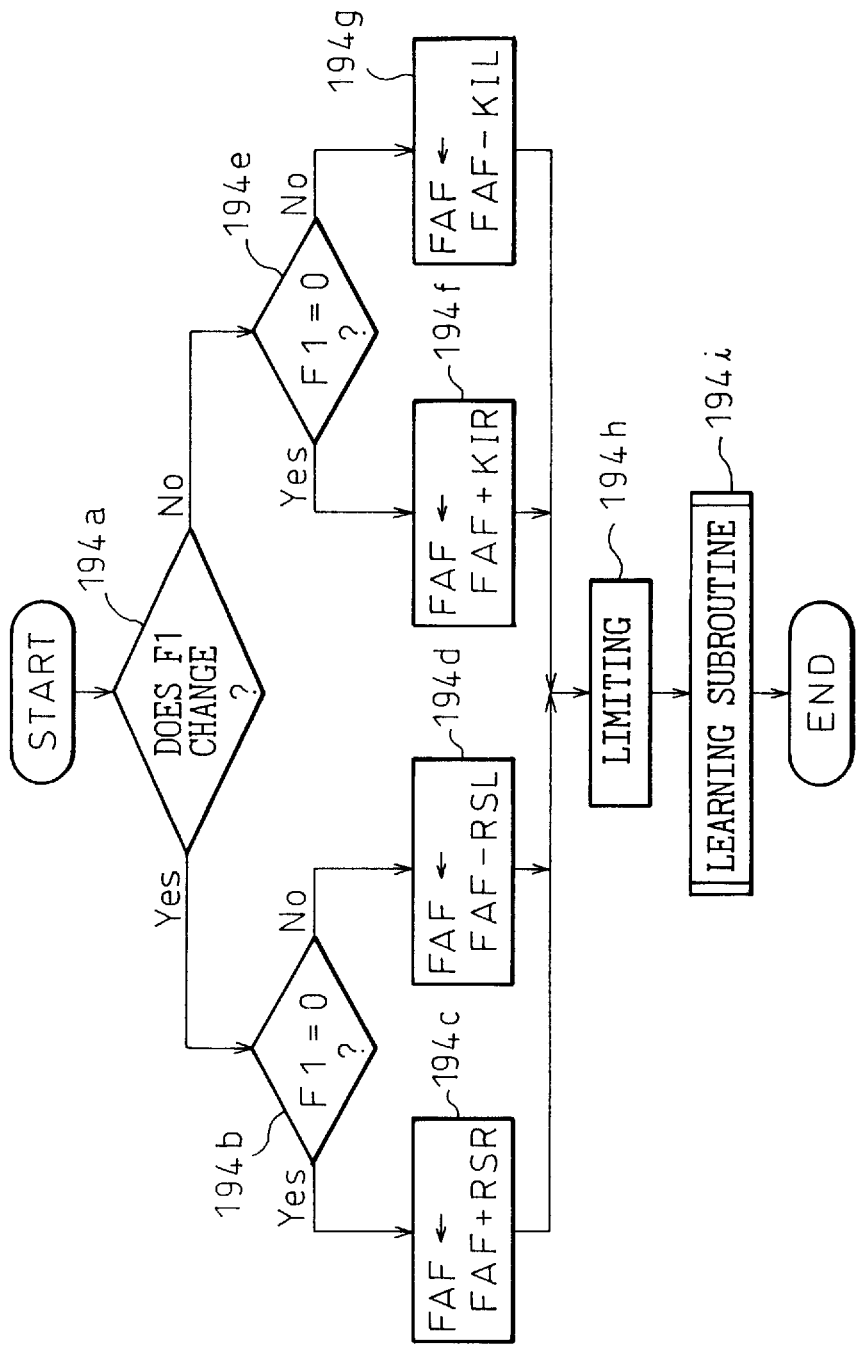
FIG. 21 is a flowchart of the correction factor calculating subroutine.

FIG. 21 is a flowchart of the air-fuel ratio correction factor calculating subroutine executed at step 194. It is determined whether or not the air-fuel ratio flag F1 changes.

When the determination at step 194a is affirmative, that is, when F1 changes, it is determined whether or not F1 is "0" at step 194b.

When the determination at step 194b is affirmative, that is, when F1 changes from the rich state to the lean state, the control proceeds to step 194h after the air-fuel ratio correction factor FAF is considerably increased using the following equation at step 194c.

$$FAF=FAF+RSR$$

When the determination at step 194b is negative, that is, when F1 changes from the lean state to the rich state, the control proceeds to step 194h after the air-fuel ratio correction factor FAF is considerably decreased using the following equation at step 194d.

$$FAF=FAF-RSL$$

When the determination at 194a is negative, that is, when F1 does not change, it is determined whether or not F1 is "0" at step 194e.

When the determination at step 194e is affirmative, that is, when F1 is maintained at the lean state, the control proceeds to step 194h after the air-fuel ratio correction factor FAF is gradually increased using the following equation at step 194f.

$$FAF=FAF+KIR$$

When the determination at step 194e is negative, that is, when F1 is maintained at the rich state, the control proceeds to step 194h after the air-fuel ratio correction factor FAF is gradually decreased using the following equation at step 194g.

$$FAF=FAF-KIL$$

Where, KIL and KIR are the integral constants and are set much smaller than the skip constants RSR and RSL.

The air-fuel ratio correction factor FAF is limited within maximum (for example, 1.2) and minimum (for example, 0.8) at step 194h.

This is for preventing the air-fuel ratio from becoming the over-rich state or the over-lean state even when the air-fuel ratio correction factor becomes too large or too small. Further, this subroutine is terminated after the leaning subroutine is executed at step 194i.

Figure 22:
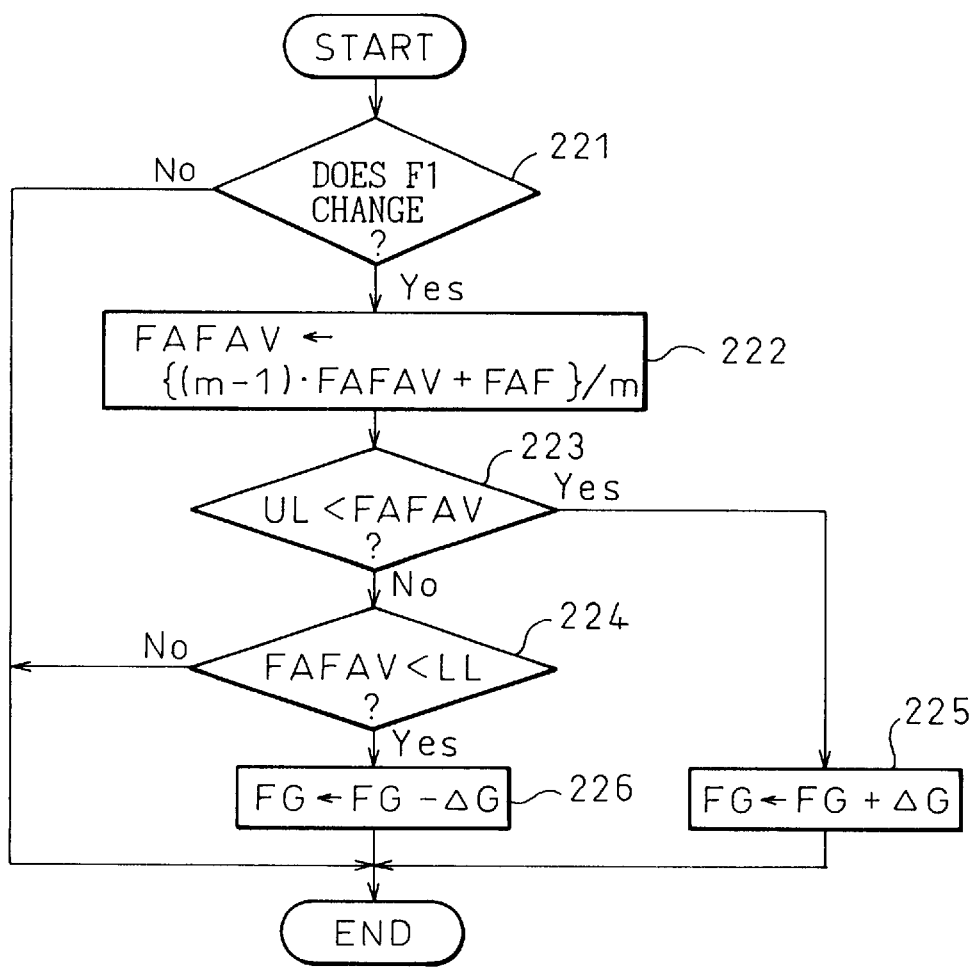
FIG. 22 is a flowchart of a learning subroutine.

FIG. 22 is a flowchart of the leaning subroutine executed at 194i. It is determined whether or not first air-fuel ratio flag F1 changes at step 221. When the determination is negative, that is, when F1 does not change, this process is directly terminated.

When the determination at step 221 is affirmative, that is, when F1 changes, the moving average of the air-fuel ratio correction factor FAF defined as FAFAV is calculated using the following equation at step 222.

$$FAFAV=[(m-1)*FAFAV+FAF]/m$$

Where, m is the number of the sampled FAF used for calculation of FAFAV.

It is determined whether or not FAFAV is larger than a fixed upper limit UL (for example, 1.005) at step 223, and is smaller than a fixed lower limit LL (for example, 0.995) at step 224. When a determination at step 223 or at step 224 is affirmative, the air-fuel ratio leaning value FG is renewed as the devices installed in the fuel supply system, such as the upstream $O_2$ sensor 131, the downstream $O_2$ sensor 133 and the fuel injection valve 37 are considered to be deteriorated.

That is, when the determination at step 223 is affirmative, the air-fuel ratio leaning factor FG is renewed using the following equation at step 225.

$$FG=FG+\Delta G$$

Where, $\Delta G$ is a constant (for example, 0.002).

When the determination at step 224 is affirmative, the routine is terminated after FG is renewed using the following equation at step 226.

$$FG=FG-\Delta G$$

When the determination at step 224 is negative, this process is directly terminated without renewing FG because the devices are considered not to be deteriorated.

Figure 23:
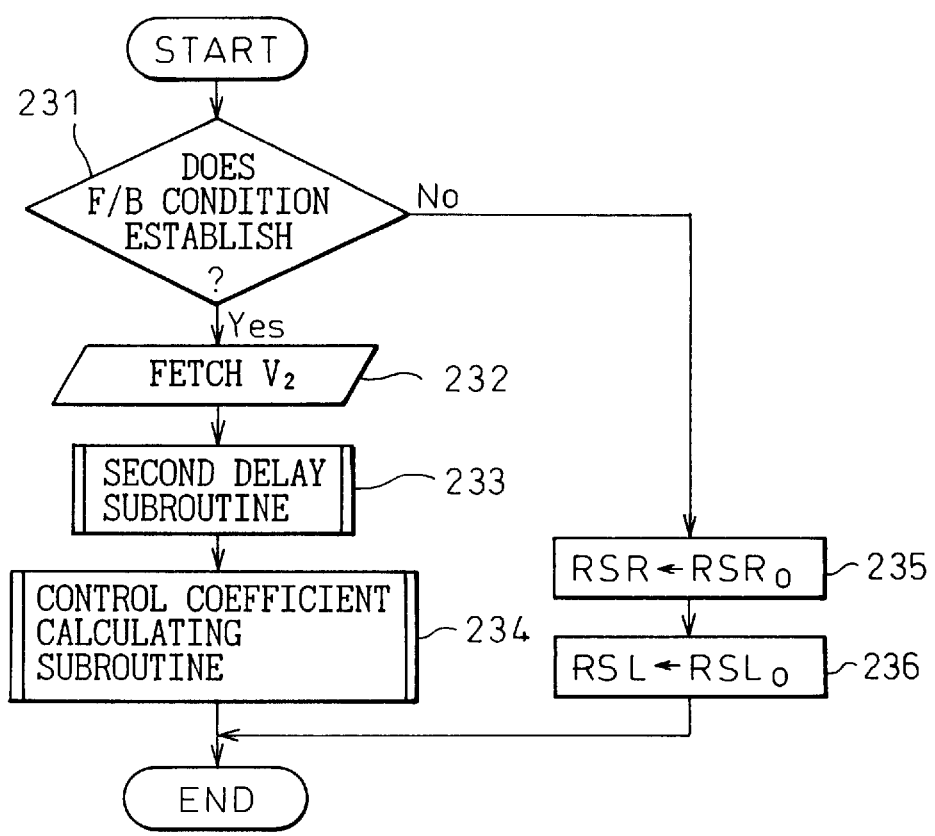
FIG. 23 is a flowchart of the second air-fuel ratio correction factor calculating routine.

FIG. 23 is a flowchart of the second air-fuel ratio correction factor calculating routine which is executed instead of the auxiliary air-fuel ratio control routine shown in FIG. 14 for the double $O_2$ sensor system. This routine is executed every fixed interval of, for example, 1s.

It is determined whether or not the condition for the feedback control with the downstream $O_2$ sensor 315 is established.

This condition is same as that with the upstream $O_2$ sensor 313, and when the feedback control with the downstream $O_2$ sensor 315 is permitted as the condition is established, the determination at step 231 is affirmative, and the output of the downstream $O_2$ sensor 315 $V_2$ is fetched at step 232.

This routine is terminated after the second delay subroutine is executed at step 233 and the control coefficient calculating subroutine is executed at step 234.

Note, when the condition is not established, the determination at step 231 is negative and this routine is terminated after the rich skip constant RSR is set to the initial value $RSR_0$ at step 235 and the lean skip constant RSL is set to the initial value $RSL_0$ at step 236.

Figure 24:
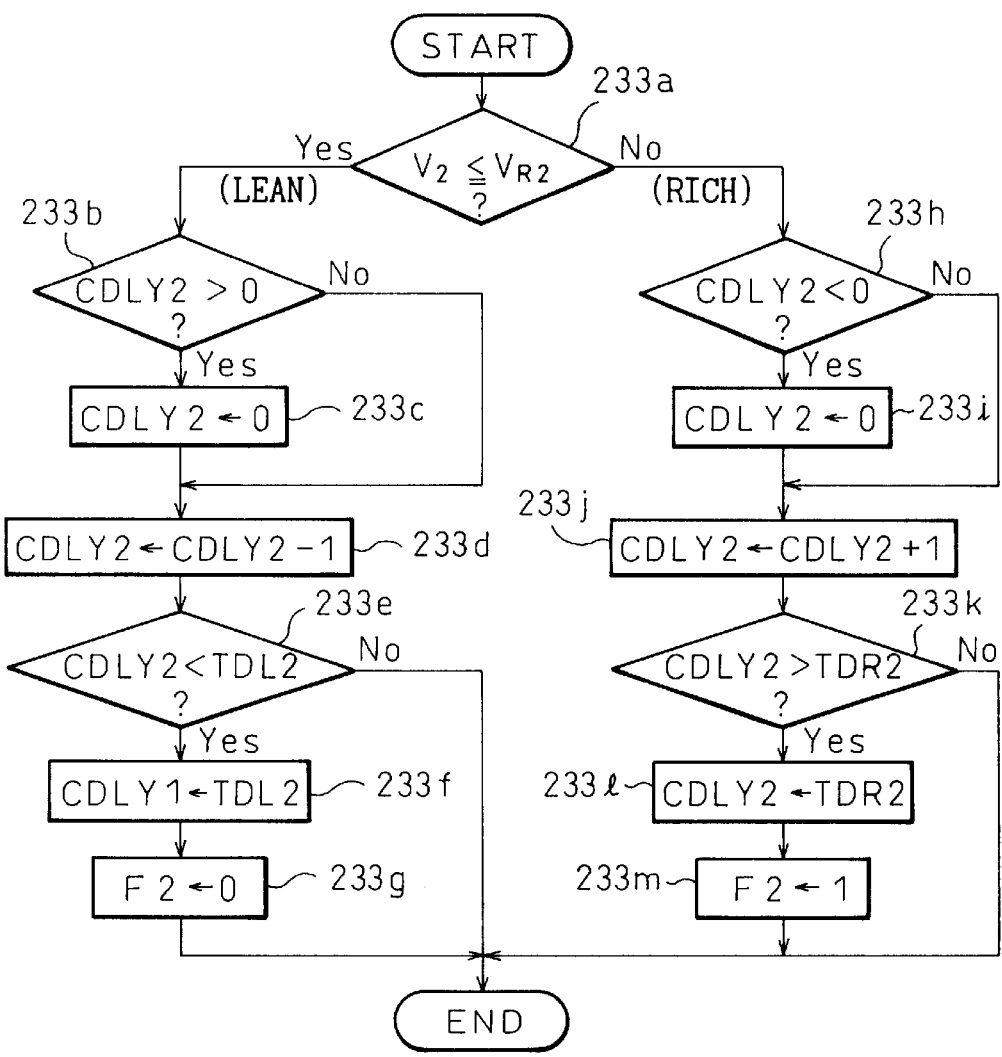
FIG. 24 is a flowchart of the second delay operation subroutine.

FIG. 24 is a flowchart of the second delay subroutine executed at step 233. It is determined whether or not the output of the downstream $O_2$ sensor 315 $V_2$ is higher than a fixed second reference voltage $V_{2R}$ (for example, 0.55V), that is, whether or not the air-fuel ratio detected by the downstream $O_2$ sensor 315 is lean.

Note, it is generally true that the second reference voltage $V_{2R}$ is set higher than the first reference voltage $V_{1R}$ because each output characteristic and deterioration trend is different from one another.

When the determination at step 233a is affirmative, that is, when the air-fuel ratio detected by the downstream $O_2$ sensor 315 is lean, it is determined whether or not the second delay counter CDLY2 is positive at step 233b.

When the determination at step 233b is affirmative, the control proceeds to step 233d after the second delay counter CDLY2 is reset at step 233c. Conversely, when the determination at step 233b is negative, the control directly proceeds to step 233d.

The second delay counter CDLY2 is decremented at step 233d, and it is determined whether or not CDLY2 is less than the second lean delay time TDL2 at step 233e.

When the determination at step 233e is affirmative, that is, when time elapsed is longer than the second lean delay time TDL2 after the output of the downstream $O_2$ sensor 353 changes from the rich state to the lean state, this subroutine is terminated after the second lean delay counter CDLY2 set to the second lean delay time TDL2 at step 233f and the second air-fuel ratio flag F2 is set to "0" at step 233g. Conversely, when the determination at step 233e is negative, this routine is directly terminated.

Note, the second lean delay time TDL2 is used for delaying the change of the second air-fuel ratio flag F2 after the output of the downstream $O_2$ sensor 315 changes from the rich state to the lean state, and is defined as a negative value.

When the determination at step 233a is negative, that is, when the air-fuel ratio detected by the downstream $O_2$ sensor 315 is rich, it is determined whether or not the second delay counter CDLY2 is negative at step 233h.

When the determination at step 233h is affirmative, the control proceeds to step 233j after the second delay counter CDLY2 is reset at step 233i. Conversely, when the determination at step 233h is negative, the control directly proceeds to step 233j.

The second delay counter CDLY2 is incremented at step 233j, and it is determined whether or not CDLY2 is less than the second rich delay time TDR2 at step 233k.

When the determination at step 233k is affirmative, that is, when time elapsed is longer than the second rich delay time TDR2 after the output of the downstream $O_2$ sensor 315 changes, this subroutine is terminated after the second lean delay counter CDLY2 is set to the second rich delay time TDR2 at step 2331 and the second air-fuel ratio flag F2 is set to "1" at step 233m. Conversely, when the determination at step 233k is negative, this routine is directly terminated.

Note, the second rich delay time TDR2 is used for delaying the turn over of the second air-fuel ratio flag F2 after the output of the downstream $O_2$ sensor 315 changes from the lean state to the rich state, and is defined as a positive value.

Figure 25:
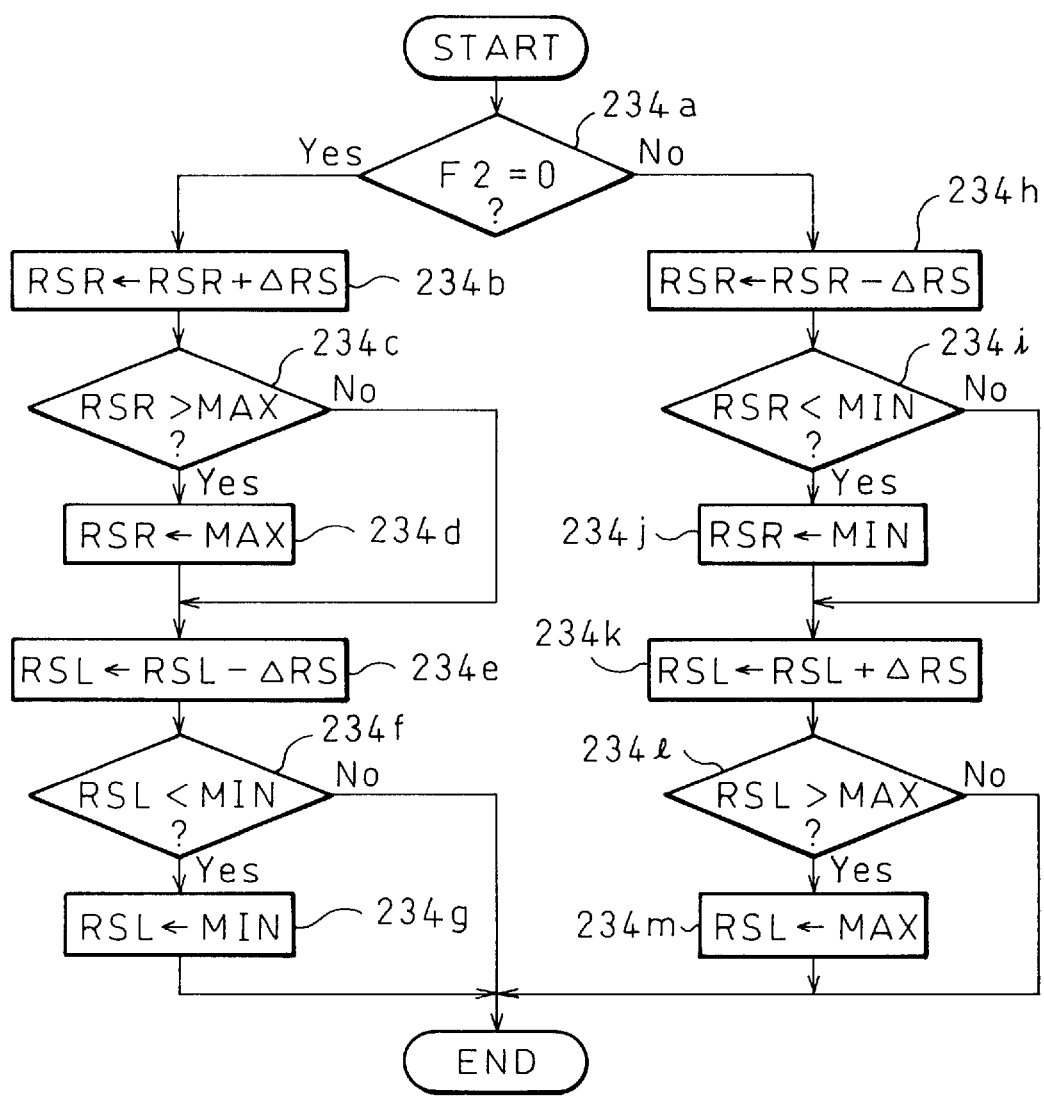
FIG. 25 is a flowchart of the control coefficient calculating subroutine.

FIG. 25 is a flowchart of the control constant calculating subroutine executed at step 234. It is determined whether or not the second air-fuel ratio flag F2 is "0".

When the determination at step 234a is affirmative, that is, when the air-fuel ratio detected by the downstream $O_2$ sensor 315 is lean, the rich skip constant RSR is increased by a fixed value ΔRS using the following equation at step 234b.

$$RSR=RSR+\Delta RS$$

When the rich skip constant RSR is larger than a fixed maximum MAX, it is limited by MAX at step 234c and step 234d.

The lean skip constant RSL is decreased by ΔRS using the following equation at step 234e.

$$RSL=RSL-\Delta RS$$

When the lean skip constant RSL is smaller than a fixed minimum MIN, it is limited by MIN at step 234f and step 234g and this subroutine is terminated.

When the determination at step 234a is negative, that is, when the air-fuel ratio detected by the downstream $O_2$ sensor 315 is rich, the rich skip constant RSR is decreased by a fixed value ΔRS using the following equation at step 234h.

$$RSR=RSR-\Delta RS$$

When the rich skip constant RSR is smaller than MIN, it is limited by MIN at step 234i and step 234j.

The lean skip constant RSL is increased by ΔRS using the following equation at step 234k.

$$RSL=RSL+\Delta RS$$

When the lean skip constant RSL is larger than MAX, it is limited by MAX at step 234i and step 234m, and this process is terminated.

Figure 26:
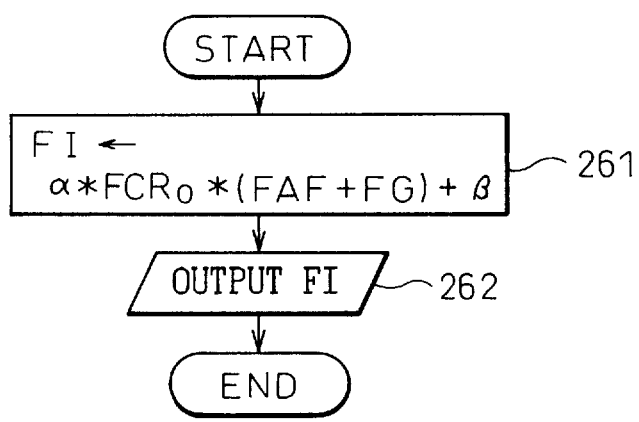
FIG. 26 is a flowchart of the second fuel injection controlling routine.

FIG. 26 is a flowchart of the second fuel injection controlling routine executed instead of the fuel injection controlling routine shown in FIG. 15 for the double $O_2$ sensor system. This routine is executed every fixed crank angle.

At first, the amount of injected fuel FI is calculated in accordance with the target amount of fuel supplied to the cylinder $FCR_0$ corrected by the air-fuel ratio correction factor FAF and the learning factor FG at step 261.

$$FI=\alpha *FCR_0*(FAF+FG)+\beta$$

Where α and β are correction factors which are determined in accordance with other operating parameters.

This routine is terminated after the amount of injected fuel FI is set to the down-counter 308 through the input-output interface 302 at step 262.

In the above-mentioned embodiment, the skip constants are renewed in accordance with the output of the downstream $O_2$ sensor. It also is possible that at least one of the other control constants, that is, the integral constants KIR and KIL, the first delay times TDR and TDL, and the first reference voltage $V_{IR}$ is renewed.

Further, it also is possible that the second air-fuel ratio correction factor FAF2 is used instead of changing of the control constants.

I claim:

1. An apparatus for detecting deterioration of a three-way catalytic converter disposed in an exhaust passage of an internal combustion engine comprising:

an upstream air-fuel ratio sensor disposed in the exhaust passage at the upstream side of said catalytic converter for outputting a signal corresponding to the air-fuel ratio of the exhaust gas at the upstream side of said catalytic converter;

a downstream air-fuel ratio sensor disposed in the exhaust passage at the downstream side of the converter for outputting a signal corresponding to the air-fuel ratio of the exhaust gas at the downstream side of the converter;

an air-fuel ratio feedback control means for controlling the amount of fuel supplied to the engine at least in accordance with the output of said upstream air-fuel ratio sensor;

a deterioration detecting means for detecting a deterioration of the converter at least in accordance with the output of said downstream air-fuel ratio sensor;

an oxygen balance estimating means for estimating a balance between the oxygen absorbing power and the oxygen releasing power; and a detection inhibiting means for inhibiting the detection of the deterioration in accordance with said deterioration detecting means when the oxygen balance estimated by said oxygen balance estimating means deviates from at least one fixed threshold.

2. An apparatus for detecting deterioration of a converter for an engine of claim 1, wherein said oxygen balance estimating means comprises:

a fuel difference calculating means for calculating a difference between the target amount of fuel required to maintain the air-fuel ratio of the engine at the stoichiometric air-fuel ratio and the actual amount of fuel supplied to the engine calculated in said air-fuel ratio feedback control means;

a change detecting means for detecting the change of the output of said downstream air-fuel ratio sensor; and a fuel difference integrating means for integrating a fuel difference calculated by said fuel difference calculating means to estimate the oxygen balance from the time when said change detecting means detects the first change of the output of said downstream air-fuel ratio sensor to the time when said change detecting means detects the second change.

3. An apparatus for detecting deterioration of a catalytic converter for an engine of claim 2, wherein said detection inhibiting means restrains from inhibiting the detection until a fixed interval is elapsed after the change of the output of said downstream air-fuel ratio sensor is detected by said change detecting means though the fuel difference integral integrated by said fuel difference integrating means deviates from a fixed upper limit or a fixed lower limit.

4. An apparatus for detecting deterioration of a catalytic converter for an engine of claim 2, wherein said change detecting means has a hysteresis characteristic between a threshold used for detecting a change from the rich state to the lean state and a threshold used for detecting a change from the lean state to the rich state.

5. An apparatus for detecting deterioration of a catalytic converter for an engine of claim 1, wherein said deterioration detecting means detects the deterioration of the converter in accordance with the length of the response curve of the output of said upstream air-fuel ratio sensor and the length of the response curve of the output of said downstream air-fuel ratio sensor.

6. An apparatus for detecting deterioration of a catalytic converter for an engine of claim 2, wherein said deterioration detecting means detects the deterioration of the converter in accordance with the frequency of deviations of the fuel difference integral integrated by said fuel difference integrating means from a fixed upper limit or a fixed lower limit.

7. An apparatus for detecting deterioration of a catalytic converter disposed in an exhaust passage of an internal combustion engine comprising:

an upstream air-fuel ratio sensor disposed in the exhaust passage at the upstream side of said catalytic converter for outputting a signal corresponding to the air-fuel ratio of the exhaust gas at the upstream side of said catalytic converter;

a downstream air-fuel ratio sensor disposed in the exhaust passage at the downstream side of said catalytic converter for outputting a signal corresponding to the air-fuel ratio of the exhaust gas at the downstream side of said catalytic converter;

an air-fuel ratio feedback control means for calculating an air-fuel ratio correction factor for correcting the amount of fuel supplied to the engine at least in accordance with said upstream air-fuel ratio sensor and an air-fuel ratio leaning factor for compensating for age deterioration of devices related to a fuel supply system;

a deterioration detecting means for detecting a deterioration of the converter at least in accordance with the output of said downstream air-fuel ratio sensor;

an oxygen balance estimating means for estimating a balance between the oxygen absorbing power and the oxygen releasing power in accordance with the integral of the difference between the air-fuel ratio correction factor and the air-fuel ratio leaning factor calculated by said air-fuel ratio feedback control means; and a detection inhibiting means for inhibiting the detection of the deterioration with said deterioration detecting means when the balance estimated by said oxygen balance estimating means deviates from at least one fixed threshold.

8. A method for detecting deterioration of a three-way catalytic converter disposed in an exhaust passage of an internal combustion engine with an upstream air-fuel ratio sensor disposed in the exhaust passage at the upstream side of said catalytic converter for outputting a signal corresponding to the air-fuel ratio of the exhaust gas at the upstream side of said catalytic converter and a downstream air-fuel ratio sensor disposed in the exhaust passage at the downstream side of said catalytic converter for outputting a signal corresponding to the air-fuel ratio of the exhaust gas at the downstream side of said catalytic converter comprising the steps of;

an air-fuel ratio feedback control step for controlling the amount of fuel supplied to the engine at least in accordance with the output of the upstream air-fuel ratio sensor;

a deterioration detecting step for detecting deterioration of the converter at least in accordance with the output of the downstream air-fuel ratio sensor;

an oxygen balance estimating step for estimating a balance between the oxygen absorbing power and the oxygen releasing power; and a detection inhibiting step for inhibiting the detection of the deterioration degree at said deterioration detecting step when the balance estimated at said oxygen balance estimating step deviates from at least one fixed threshold.

9. A method for detecting deterioration of a catalytic converter for an engine of claim 8, wherein said oxygen balance estimating step comprises steps of:
a fuel difference calculating step for calculating a difference between a target amount of fuel required to maintain the air-fuel ratio of the engine at the stoichiometric air-fuel ratio and an actual amount of fuel calculated at said air-fuel ratio feedback control step;

a change detecting step for detecting the change of the output of the downstream air-fuel ratio sensor; and a fuel difference integrating step for integrating a fuel difference calculated at said fuel difference calculating step to estimate the oxygen balance form the time when the first change of the output of said downstream air-fuel ratio sensor is detected at said change detecting step to the time when the second change is detected at said change detecting step.

10. A method for detecting deterioration of a catalytic converter for an engine of claim 9, wherein said detection inhibiting step restrains from inhibiting the detection until a fixed interval is elapsed after the change of the output of said downstream air-fuel ratio sensor is detected at said change detecting step though the fuel difference integral integrated at said fuel difference integrating step deviates from a fixed upper limit or a fixed lower limit.

11. A method for detecting deterioration of a catalytic converter for an engine of claim 9, wherein said change detecting step has a hysteresis characteristic between a threshold used for a change from the rich state to the lean state and a threshold used for a change from the lean state to the rich state.

12. A method for detecting deterioration of a converter for an engine of claim 8, wherein said deterioration detecting step detects the deterioration of the converter in accordance with the length of the response curve of the output of the upstream air-fuel ratio sensor and the length of the response curve of the output of the downstream air-fuel ratio sensor.

13. A method for detecting deterioration of a converter for an engine of claim 9, wherein said deterioration detecting step detects the deterioration of the converter in accordance with the frequency of deviations of the fuel difference integral integrated at said fuel difference integrating step from a fixed upper limit or a fixed lower limit.

14. A method for detecting deterioration of a three-way catalytic converter disposed in an exhaust passage of an internal combustion engine with an upstream air-fuel ratio sensor disposed in the exhaust passage at the upstream side of said catalytic converter for outputting a signal substantially proportional to the air-fuel ratio of the exhaust gas at the upstream side of said catalytic converter and a downstream air-fuel ratio sensor disposed in the exhaust passage at the downstream side of said catalytic converter for outputting a signal corresponding to the air-fuel ratio of the exhaust gas at the downstream side of said catalytic converter comprising the steps of;

an air-fuel ratio feedback control step for calculating an air-fuel ratio correction factor for correcting the amount of fuel supplied to the engine at least in accordance with the output of the upstream air-fuel ratio sensor and an air-fuel ratio leaning factor for compensating for age deterioration of devices related to a fuel supply system;

a deterioration detecting step for detecting a deterioration degree of the converter at least in accordance with the output of the downstream air-fuel ratio sensor;

an oxygen balance estimating step for estimating a balance in accordance with the integral of the difference between the air-fuel ratio correction factor and the air-fuel ratio leaning factor calculated at said air-fuel ratio feedback control step; and a detection inhibiting step for inhibiting the detection of the deterioration at said deterioration detecting step when the balance estimated at said oxygen balance estimating step deviates from at least one fixed threshold.

* * * * *